United States Patent
Xie et al.

(10) Patent No.: US 11,221,598 B2
(45) Date of Patent: *Jan. 11, 2022

(54) METHOD AND APPARATUS FOR CONTROLLING DEVICE USING A SERVICE RULE

(71) Applicant: SAMSUNG ELECTRONICS CO., LTD., Suwon-si (KR)

(72) Inventors: Yuzhi Xie, Nanjing (CN); Feng Tang, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,080

(22) Filed: Nov. 26, 2018

(65) Prior Publication Data

US 2019/0094824 A1    Mar. 28, 2019

Related U.S. Application Data

(63) Continuation of application No. 14/971,433, filed on Dec. 16, 2015, now Pat. No. 10,146,195.

(30) Foreign Application Priority Data

Dec. 16, 2014 (CN) .......................... 201410781238.2
Nov. 20, 2015 (KR) .......................... 10-2015-0163352

(51) Int. Cl.
*G05B 15/02* (2006.01)
*H04L 12/28* (2006.01)

(52) U.S. Cl.
CPC ............ *G05B 15/02* (2013.01); *H04L 12/282* (2013.01); *H04L 12/2809* (2013.01);
(Continued)

(58) Field of Classification Search
CPC ............ G05B 15/02; G05B 2219/2642; H04L 12/2809; H04L 12/282; H04L 12/2829; H04L 12/2834
(Continued)

(56) References Cited

U.S. PATENT DOCUMENTS 6,876,889 B1    4/2005 Lortz et al.
8,788,097 B2    7/2014 Drees
(Continued)

FOREIGN PATENT DOCUMENTS

CN    103279687 A    9/2013
CN    103293994 A    9/2013
(Continued)

OTHER PUBLICATIONS

Communication dated Apr. 30, 2019, issued by the European Patent Office in counterpart European Application No. 15870315.7.
(Continued)

*Primary Examiner* — Kenneth M Lo
*Assistant Examiner* — Michael W Choi
(74) *Attorney, Agent, or Firm* — Sughrue Mion, PLLC

(57) ABSTRACT

A method of controlling devices connected to a controller includes receiving, from a server, a service rule including a trigger condition and a device executing action which is an action to be performed by one of the devices according to whether the trigger condition is satisfied, selecting one of the devices connected to the controller based on the received service rule, modifying the received service rule to control the selected device, and controlling the selected device according to the modified service rule.

10 Claims, 24 Drawing Sheets

(52) U.S. Cl.
CPC ...... *H04L 12/2829* (2013.01); *H04L 12/2834* (2013.01); *G05B 2219/2642* (2013.01)

(58) Field of Classification Search
USPC .......................................................... 700/19
See application file for complete search history.

(56) References Cited

U.S. PATENT DOCUMENTS

| | | | |
|---|---|---|---|
| 2003/0187659 A1* | 10/2003 | Cho | H04L 12/282 704/275 |
| 2004/0054789 A1 | 3/2004 | Breh et al. | |
| 2005/0197989 A1 | 9/2005 | Hori et al. | |
| 2007/0156256 A1 | 7/2007 | Jung | |
| 2009/0064192 A1 | 3/2009 | Betts | |
| 2011/0106279 A1 | 5/2011 | Cho et al. | |
| 2014/0075321 A1 | 3/2014 | Masera | |
| 2014/0101082 A1 | 4/2014 | Matsuoka et al. | |
| 2015/0040144 A1 | 2/2015 | Mineno et al. | |
| 2015/0345817 A1* | 12/2015 | Kobori | G05B 15/02 700/276 |
| 2015/0370230 A1* | 12/2015 | Duchene | G05B 19/0426 700/275 |
| 2016/0112240 A1* | 4/2016 | Sundaresan | H04W 4/90 726/1 |

FOREIGN PATENT DOCUMENTS

| | | |
|---|---|---|
| CN | 103345152 A | 10/2013 |
| CN | 103346938 A | 10/2013 |
| CN | 103592925 A | 2/2014 |
| CN | 103713612 A | 4/2014 |
| CN | 103730116 A | 4/2014 |
| KR | 10-2014-0118925 A | 10/2014 |
| KR | 10-1481536 B1 | 1/2015 |
| WO | 2006/049360 A1 | 5/2006 |
| WO | 2013157144 A1 | 10/2013 |
| WO | 2014/004705 A1 | 1/2014 |

OTHER PUBLICATIONS

Communication dated Mar. 25, 2016, issued by the International Searching Authority in counterpart International Application No. PCT/KR2015/013799 (PCT/ISA/220, 210, 237).
Communication dated Sep. 13, 2017, issued by the European Patent Office in counterpart European Application No. 15870315.7.
Communication dated May 18, 2017 issued by the State Intellectual Property Office in counterpart Application No. 201410781238.2.
Ur et al., "Practical Trigger-Action Programming in the Smart Home", CHI '14 Proceedings of the SIGCHI Conference on Human Factors in Computing Systems, pp. 803-812, Apr. 26-May 1, 2014, Toronto, ON, Canada.
Communication dated Jul. 31, 2020, issued by the India Intellectual Property Patent Office in counterpart India Application No. 201737014324.

* cited by examiner

FIG. 4

| DEVICE INFORMATION (400) |||
|---|---|---|
| DEVICE ID | DEVICE TYPE | DEVICE LOCATION |
| A | TV | LIVING ROOM |
| B | REFRIGERATOR | KITCHEN |
| C | WINDOW | LIVING ROOM |
| ⋮ | ⋮ | ⋮ |
| Z | ELECTRIC LIGHT | BATHROOM |

FIG. 20

```xml
<Rule id="a8cedeb9-1c09-4d6c-b557-36a1c5f202b7" name="Turn On Light and Air Conditioner When Enter Hot Living Room At Night"
description="Turn on the light and air conditioner in living room, when door is open, room is hot and time is after 18pm"
triggerRelation="and">
    <Trigger>
        <Device>DoorSensor</Device>
          <Location>LivingRoom</Location>
          <Property>DoorState</Property>
        <Condition>equal</Condition>
          <Value>open</Value>
    </Trigger>
    <Trigger>
        <Device>Home</Device>
        <Property>IsHot</Property>
        <Condition>equal</Condition>
        <Value>yes</Value>
    </Trigger>
    <Trigger>
        <Device>Time</Device>
        <Property>Hour</Property>
        <Condition>largerThan</Condition>
        <Value>18</Value>
    </Trigger>
    <Action>
        <Device>Light</Device>
        <Location>LivingRoom</Location>
        <ActionName>SetPowerState</ActionName>
        <InputParameter>
            <Attribute>power_state</Attribute>
            <Value>on</Value>
        </InputParameter>
    </Action>
    <Action>
        <Device>Air_Conditioner</Device>
        <Location>LivingRoom</Location>
        <ActionName>SetPowerState</ActionName>
        <InputParameter>
            <Attribute>power_state</Attribute>
            <Value>on</Value>
        </InputParameter>
    <Action>
<Rule >
```

FIG. 21

| LOCATION INFORMATION 2110 | | |
|---|---|---|
| ROOM ID | ROOM NAME | LOCATION |
| a8cedeb9-1c09-4d6c-b557-36a1c5f202b7 | Zhang San's living room | living room |
| 4c4f0bad-1cd1-4a49-c8d1-064eac8da758 | main drawing room | drawing room |

FIG. 22

| | DEVICE INFORMATION 2120 | | |
|---|---|---|---|
| DEVICE ID | DEVICE NAME | ROOM ID | DEVICE TYPE |
| a8cedeb9-1c09-4d6c-b557-36a1c5f202b7 | door of the living room | a8cedeb9-1c09-4d6c-b557-36a1c5f202b7 | door |
| 70518778-b223-0cf5-3544-bc8ae1149678 | headlamp | a8cedeb9-1c09-4d6c-b557-36a1c5f202b7 | electric light |
| 7d1f04bd-478a-1e00-33f3-f52498e5f609 | lamplet | a8cedeb9-1c09-4d6c-b557-36a1c5f202b7 | electric light |
| 5b42c5a3-b554-af9e-ec36-57fcea88a140 | air conditioner in the living room | a8cedeb9-1c09-4d6c-b557-36a1c5f202b7 | air conditioner |
| 3857792a-7d29-24e3-f82f-2695cfe43839 | Thermometer in the living room | a8cedeb9-1c09-4d6c-b557-36a1c5f202b7 | thermometer |
| d1e8c31f-355d-1cfa-a3c2-cc5700a45d6e | TV in the drawing room | 4c4f0bad-1cd1-4a49-c8d1-064eac8da758 | TV |
| 84d9a419-5578-a00c-f3eb-384d7dabb0cc | air conditioner in the drawing room | 4c4f0bad-1cd1-4a49-c8d1-064eac8da758 | air conditioner |
| d327d98d-cc56-0674-b726-82a4af3f4044 | current time | N/A | time |
| 0cd89ccd-39ef-3f46-095a-4b5e72a6d69f | home of user B | N/A | home |

FIG. 23

```xml
<Rule id="a8cedeb9-1c09-4d6c-b557-36a1c5f202b7" name="Turn On Light and Air Conditioner When Enter Hot Living Room At Night"
description="Turn on the light and air conditioner in living room, when door is open, room is hot and time is after 18pm"
triggerRelation="and">
    <Trigger>
        <DeviceId>ee67fbf-41ef-63fd-c724-b54b8c0adbd4</DeviceId>
        <Property>DoorState</Property>
        <Condition>equal</Condition>
        <Condition>equal</Condition>
        <Value>open</Value>
    </Trigger>
    <Trigger>
        <DeviceId>0cd89ccd-39ef-3f46-095a-4b5e72a6d69f</DeviceId>
        <Property>IsHot</Property>
        <Condition>equal</Condition>
        <Value>yes</Value>
    </Trigger>
    <Trigger>
        <DeviceId>d327d98d-cc56-0674-b726-82a4af3f4044</DeviceId>
        <Property>Hour</Property>
        <Condition>largerThan</Condition>
        <Value>18</Value>
    </Trigger>
    <Action>
        <DeviceId>70518778-b223-0cf5-3544-bc8ae1149678</DeviceId>
        <ActionName>SetPowerState</ActionName>
        <InputParameter>
            <Attribute>power_state</Attribute>
            <Value>on</Value>
        </InputParameter>
    </Action>
    <Action>
        <DeviceId>7d1f04bd-478a-1e00-33f3-f52498e5f609</DeviceId>
        <ActionName>SetPowerState</ActionName>
        <InputParameter>
            <Attribute>power_state</Attribute>
            <Value>on</Value>
        </InputParameter>
    </Action>
    <Action>
        <DeviceId>5b42c5a3-b554-af9e-ec36-57fcea88a140</DeviceId>
        <ActionName>SetPowerState</ActionName>
        <InputParameter>
            <Attribute>power_state</Attribute>
            <Value>on</Value>
        </InputParameter>
    </Action>
<Rule >
```

DEVICE LOG 2420

| NUMBER | EXECUTING TIME | DEVICE ID | ACTION NAME | ACTION PARAMETER |
|---|---|---|---|---|
| 1034 | 2014-08-26 21:35:40 | 70518778-b223-0cf5-3544-bc8ae1149678 | SetPowerState | power_state: on |
| 1035 | 2014-08-26 21:35:41 | 7d1f04bd-478a-1e00-33f3-f52498e5f609 | SetPowerState | power_state: on |
| 1034 | 2014-08-26 21:35:43 | 5b42c5a3-b554-af9e-ec36-57fcea88a140 | SetPowerState | power_state: on |

METHOD AND APPARATUS FOR CONTROLLING DEVICE USING A SERVICE RULE

CROSS-REFERENCE TO RELATED APPLICATIONS

This application is a Continuation Application of U.S. application Ser. No. 14/971,433, filed on Dec. 16, 2015, which claims priority to Chinese Patent Application No. 201410781238.2, filed on Dec. 16, 2014, with the Chinese Intellectual Property Office and Korean Patent Application No. 10-2015-0163352, filed on Nov. 20, 2015, in the Korean Intellectual Property Office, the disclosures of which are incorporated herein in their entireties by reference.

BACKGROUND

1. Field

The exemplary embodiments relate to methods and apparatuses for controlling devices and, more particularly, to apparatuses that control a plurality of devices connected thereto, and control methods of the same.

2. Description of the Related Art

Owing to the development of information and communication technologies, it has become possible to add communication interfaces to a wide variety of devices such as sensors, washing machines, and refrigerators in addition to devices having intrinsic communication functionality such as smartphones and tablet PCs so as to establish a network connection to the devices and facilitate sharing of information between the devices.

A smart home is a system where various devices such as electric appliances, energy consuming devices, and security devices are connected to a network based on the information and communication technologies, and the smart home enables users to effectively control and manage the devices. In the smart home system, devices which are independent from each other, spaced apart from each other, and having different functions from each other may be interconnected to make a home environment more convenient and safer through communication and sharing information.

Currently, smart home systems are based on service rules, and the home environment operates according to the service rules. For example, if there is a service rule that 'when the temperature is greater than or equal to 30 degrees (e.g., 30 degrees C.°), turn on an air conditioner', the air conditioner operates automatically when the temperature measured in a designated location rises to 30 degrees or higher. The house devices may be automatically controlled in such a manner.

According to conventional smart home systems, however, the service rules may be excessively associated with a current environment, e.g., a home environment to which the service rules are applied, and thus may be effective only in the current environment but not applicable to an external smart home system. In other words, the service rules may not be shared between respectively different smart home systems. Thus, the service rules of conventional smart home systems lack the ability to be applied generally and in a convenient fashion.

SUMMARY

Provided are methods and apparatuses for controlling devices.

Provided are apparatuses for controlling a plurality of devices connected to the apparatuses, and methods being performed by the apparatuses.

Additional aspects will be set forth in part in the description which follows and, in part, will be apparent from the description, or may be learned by practice of the presented exemplary embodiments.

According to an aspect of an exemplary embodiment, there is provided a method of controlling devices connected to a controller, the method including: receiving, from a server, a service rule comprising a trigger condition and a device executing action which is an action to be performed by one of the devices according to whether the trigger condition is satisfied; selecting one of the devices connected to the controller based on the received service rule; modifying the received service rule to control the selected device; and controlling the selected device according to the modified service rule.

The service rule may include one of a device type indicating a type of a device to which the service rule is to be applied and a device location indicating a location of a device to which the service rule is to be applied.

The selecting may include selecting the device from among devices having the type corresponding to the device type and devices installed at the location corresponding to the device location.

The modifying may include modifying the received service rule based on a specification of the selected device, the specification including one of identification information of the selected device or technical characteristics of the selected device.

The modifying may include changing a device type corresponding to the trigger condition in the received service rule into an identification value identifying the selected device.

The modifying may include changing a device action corresponding to the trigger condition in the received service rule into a control command which controls the selected device.

The modifying may include changing a device type corresponding to the device executing action in the received service rule into an identification value identifying the selected device.

The modifying may include changing a device action corresponding to the device executing action in the received service rule into a control command which controls the selected device.

The controlling may include determining whether the trigger condition is satisfied; and in response to determining that the trigger condition is satisfied, controlling the selected device to perform the device executing action corresponding to the satisfied trigger condition.

The controlling may include transmitting a control command to the selected device, the control command being a command which controls the selected device.

According to another aspect of an exemplary embodiment, there is provided a control apparatus configured to control devices connected to the control apparatus, the control apparatus including: a communicator configured to receive, from a server, a service rule including a trigger condition and a device executing action which is an action to be performed by one of the devices according to whether the trigger condition is satisfied; and a controller configured to select one of the devices connected to the control apparatus based on the received service rule, modify the received service rule, and control the selected device by using the modified service rule.

The service rule may include at least one of a device type indicating a type of a device to which the service rule is to be applied and a device location indicating a location of a device to which the service rule is to be applied.

The controller may be configured to select the device from among devices having the type corresponding to the device type and devices installed at the location corresponding to the device location.

The controller may be configured to modify the received service rule based on a specification of the selected device, the specification including one of identification information of the selected device or technical characteristics of the selected device.

The controller may be configured to change a device type corresponding to the trigger condition included in the received service rule into an identification value identifying the selected device.

The controller may be configured to change a device action corresponding to the trigger condition included in the received service rule into a control command which controls the selected device.

The controller may be configured to change a device type corresponding to the device executing action in the received service rule into an identification value identifying the selected device.

The controller may be configured to change a device action corresponding to the device executing action in the received service rule into a control command which controls the selected device.

The controller may be configured to determine whether the trigger condition is satisfied and, in response to determining that the trigger condition is satisfied, control the selected device to perform the device executing action corresponding to the satisfied trigger condition.

The controller may be configured to transmit a control command which controls the selected device to the selected device.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 is a table showing device information stored in a controller according to an exemplary embodiment;

FIG. 20 shows an example of service rule template data according to an exemplary embodiment;

FIG. 21 shows an example of home instance data according to an exemplary embodiment;

FIG. 22 shows another example of home instance data according to an exemplary embodiment;

FIG. 23 shows an example of service rule instance data according to an exemplary embodiment; and FIG. 24 shows an example of device log data according to an exemplary embodiment.

DETAILED DESCRIPTION

Figure 1:
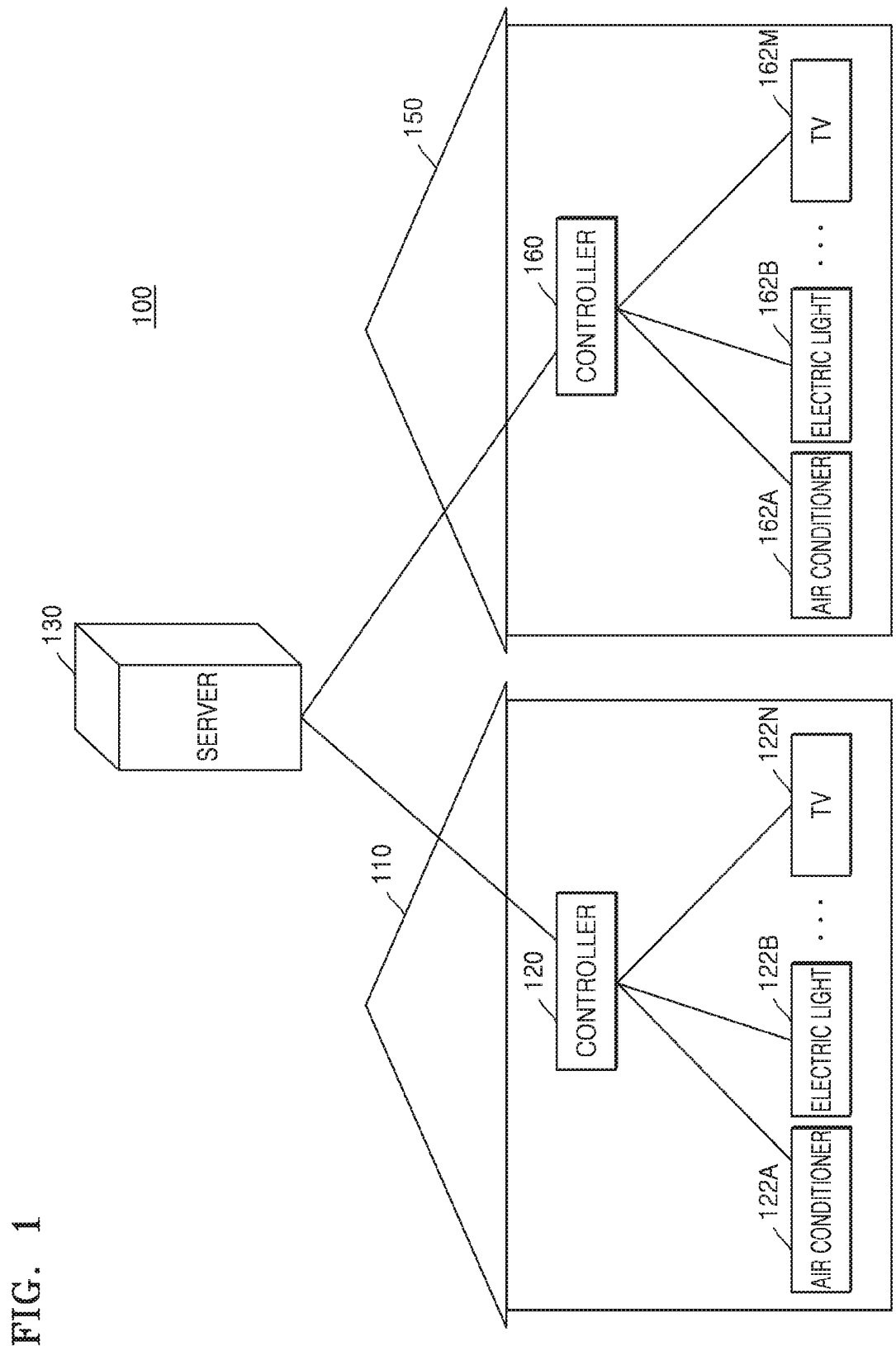
FIG. 1 is a schematic diagram illustrating a device control system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. The same or similar components may be designated by the same or similar reference numerals although the same or similar components are illustrated in different drawings.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected to" another element, the element can be "directly connected to" the other element or "electrically connected to" the other element. The terms "comprises" and/or "comprising" or "includes" and/or "including" or "contains" and/or "containing", when used in this specification, specify the presence of stated elements, but do not preclude the presence or addition of one or more other elements. Also, the term 'unit' in the exemplary embodiments may refer to a software component or hardware components such as a field-programmable gate array (FPGA) or an application-specific integrated circuit (ASIC), and may perform a specific function. However, the term 'unit' is not limited to software or hardware. The term 'unit' may be configured to be included in an addressable storage medium or to reproduce one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with the smaller number of components and 'units', or may be divided into additional components and 'units'.

Exemplary embodiments are described in detail herein with reference to the accompanying drawings so that the exemplary embodiments may be easily performed by one of ordinary skill in the art to which the exemplary embodiments pertain. In the drawings, parts irrelevant to the description are omitted for simplicity of explanation.

Although general terms widely used at present were selected for describing the exemplary embodiments in consideration of the functions thereof, these general terms may vary according to intentions of one of ordinary skill in the art, case precedents, the advent of new technologies, and the like. Terms arbitrarily selected by the applicant may also be used in a specific case. In this case, the meanings of these terms should be given in the detailed description of the exemplary embodiments. Hence, the terms should be defined based on the meanings of the terms and the contents of the entire specification, not by simply stating the terms.

FIG. 1 illustrates a device control system 100 according to an exemplary embodiment. The device control system 100 includes two local device control systems 110 and 150, which are independent from each other and each connected to a server 130.

The local device control system 110 is configured to control devices 122A-122N in the local device control system 110. The local device control system 150 is configured to control devices 162A-162M in the local device control system 150. Each of the local device control systems 110 and 150 may be any kind of system by which a controller 120 or 160 may control the devices 122A-122N or 162A-162M through a network interconnecting the controller 120 or 160 and the devices 122A-122N or 162A-162M to each other. Examples of such systems include a smart home system and a smart office system. The local device control systems 110 and 150 may be connected to the server 130 and the other local device control systems through the network. It is understood, however, that the local device control systems 110 and 150 are not limited to being a smart home system or a smart office system, and may be many other types of systems used in many different types of environments, including various types of stationary environments (homes, offices, schools, outdoor environments) or mobile environments (trains, planes, etc.).

According to an exemplary embodiment, the local device control system 110 includes at least one controller 120 and at least one of the devices 122A-122N connected to the controller 120. The local device control system 150 includes at least one controller 160 and at least one of the devices 162A-162M connected to the controller 160.

The controllers 120 and 160 control the devices 122A-122N and 162A-162M, respectively, connected to the controllers 120 and 160. The controllers 120 and 160 may control the devices 122A-122N and 162A-162M according to service rules set previously. Specifically, the controllers 120 and 160 may determine whether a service condition is satisfied with respect to a certain device, and control the device to perform a certain action when the service condition is satisfied. At this time, the controllers 120 and 160 may control the device by generating a control command and sending the control command to the device.

In the case that the local device control systems 110 and 150 include two or more controllers, the controllers may be configured hierarchically so that one of the controllers controls the devices through another controller or, alternatively, configured in parallel so that each of the controllers controls a separate device set.

The controllers 120 and 160, located between the server 130 and the devices 122A-122N and 162A-162M, may be a gateway or a router. The controllers 120 and 160 may communicate with the server 130 or another control apparatus to exchange the service rules therebetween.

The devices 122A-122N and 162A-162M are connected to the respective controller 120 and 160 and perform operations corresponding to the functions of the devices. The devices 122A-122N and 162A-162M may include all appliances and facilities at home. For example, the devices 122A-122N and 162A-162M may include: home appliances such as a television, an air conditioner, a refrigerator, a washing machine, a table gas range, and an electric light; sensors such as a temperature sensor and a motion sensor; and furniture such as externally controllable doors and windows.

The devices 122A-122N and 162A-162M may transmit their state information to their respective controller 120 and 160, and receive control commands from the controllers 120 and 160 to operate according to the control commands.

Hereinbelow, the device control system 100 will be described in more detail with reference to the drawings.

Figure 2:
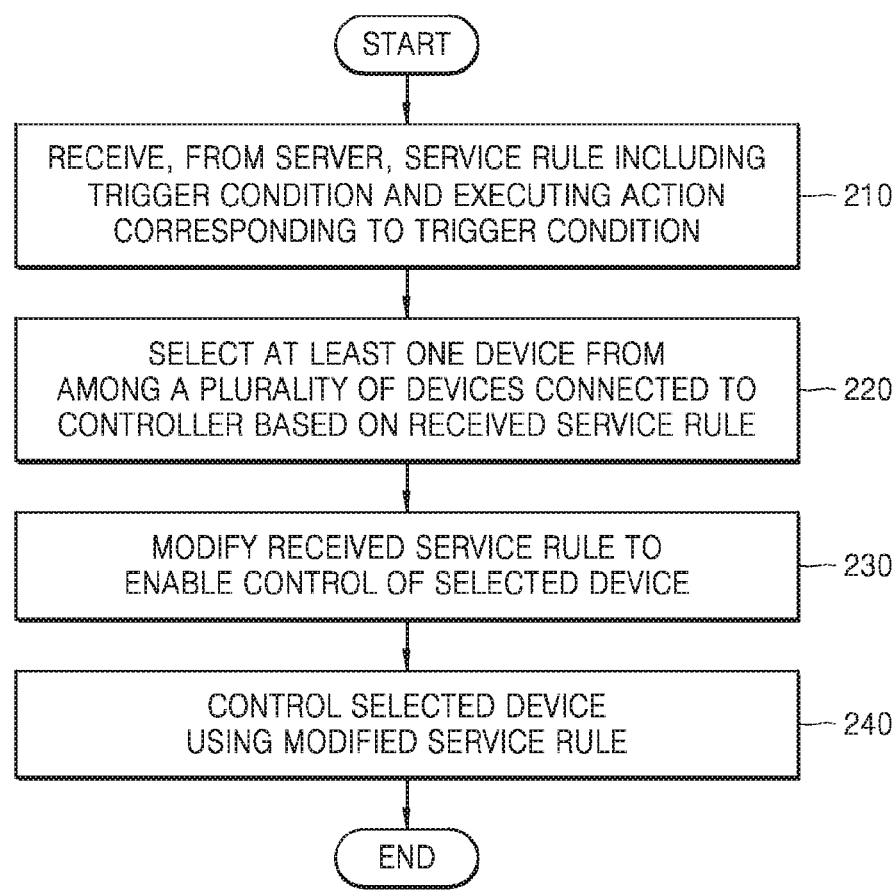
FIG. 2 is a flowchart showing a device control method performed by a controller according to an exemplary embodiment.

FIG. 2 is a flowchart showing a device control method performed by a controller according to the exemplary embodiment.

In operation 210, the controller 120 or 160 receives, from the server 130, the service rule containing trigger condition information and executing action information corresponding to the trigger condition information. The service rule is information for the controllers 120 and 160 to control the devices 122A-122N and 162A-162M, and may be configured such that, when a certain condition is satisfied, the device corresponding to the condition executes an action designated by the service rule. The service rule received from the server 130 contains information that can be used for selecting a device to which the service rule is to be applied rather than directly designating a particular device to which the service rule is to be applied. For example, the service rule may specify a rule in a form having the following conditions: 'if the temperature measured in the living room is greater than or equal to 29 degrees, turn on power of the air conditioner in the living room' rather than designate a particular device by specifying a rule such as 'if the temperature measured by a device A is greater than or equal to 29 degrees, turn on power of a device B.' According to an exemplary embodiment, the service rules are specified in a general form so as to be applicable to any environment and sharable between systems, and may enhance universality and convenience.

Figure 3:
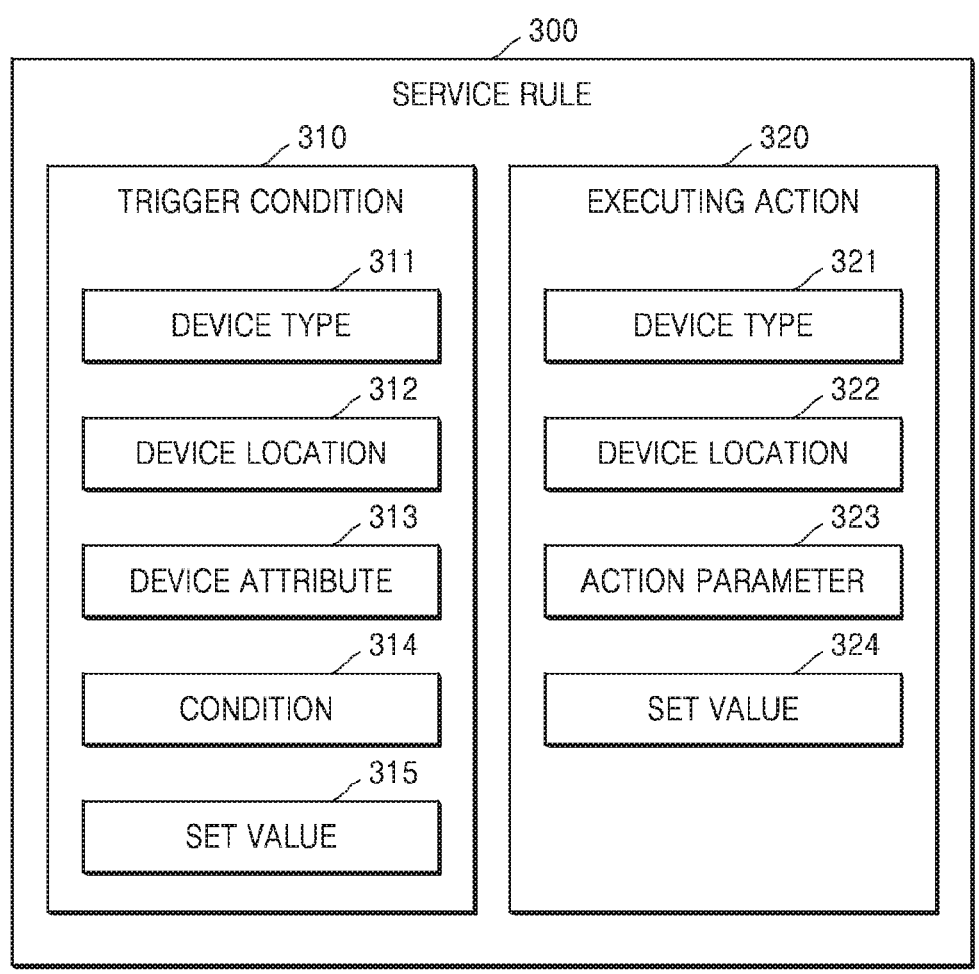
FIG. 3 is a schematic diagram illustrating a service rule according to an exemplary embodiment.

FIG. 3 illustrates a service rule 300 according to an exemplary embodiment.

The service rule 300 includes a trigger condition 310 and an executing action 320. The trigger condition 310 includes information about a condition according to which the executing action is triggered. The executing action 320 contains information about an action to be executed when the trigger condition is satisfied. To summarize, the service rule 300 includes both the trigger condition 310 and the executing action 320 corresponding to the trigger condition 310.

The service rule 300 may include device types 311 and 321 and/or device locations 312 and 322. The device types 311 and 321 represent types of devices. For example, the device types 311 and 321 may designate one of the home appliances such as a television, an air conditioner, a refrigerator, a washing machine, a table gas range, and electric light, sensors such as a temperature sensor and a motion sensor, and furniture such as externally controllable doors and windows. It is understood that many other types of electrical devices, including non-appliances, may also be designated. The device locations 312 and 322 represent where the devices are located in the local device control systems 110 and 150. For example, when the local device control systems 110 and 150 are smart home systems applied to a home, the device locations 312 and 322 may represent: living room, inner room, kitchen, bathroom, and entrance (or other areas inside or outside of the house, e.g., basement, garage, back yard, etc.). When the local device control systems 110 and 150 are hotel management systems applied to hotels, the device location information 312 and 322 may represent: lobby, check-in counter, powder room, and hotel room, or more specifically, bathroom, entrance, and bedroom in the hotel room (as well as many other types of rooms and areas).

The device types 311 and 321 and the device locations 312 and 322 may be used for selecting the device to which the service rule is to be applied. Although the device types 311 and 321 and the device locations 312 and 322 may be included in the trigger condition 310 and the executing action 320, as shown in FIG. 3, these pieces of information may be included in the service rule 300 separately from the trigger condition 310 and the executing action 320.

According to an exemplary embodiment, the trigger condition 310 may include a device attribute 313, a condition 314, and a set value 315. The device attribute 313 designates properties of a device and may be represented by temperature, humidity, light, illumination level, power state, or time. The condition 314 is information for setting the trigger condition, and may represent one of the comparison operators such as 'greater than or equal to', 'less than or equal to', 'greater than', 'less than, 'equals', and 'not equal to.' The set value 315 may represent a specific value or on/off state. The trigger condition 310 may include another kind of information for setting the trigger condition in addition to the device attribute 313, the condition 314, and the set value 315. For example, in order to allow setting an executable condition that two or more trigger conditions are to be both satisfied, the trigger condition 310 may include information regarding the number of trigger conditions to be satisfied. The trigger conditions described above are only presented for convenience of explanation, and the trigger condition 310 may include other information that may be apparent to those of ordinary skill in the art from the above description.

The executing action 320 may contain an action parameter 323 and a set value 324. The action parameter 323 represents a parameter for setting the action of the device, and may represent a power state, or a door open gas supply, for example. The set value 324 is a value for the action parameter 323, and may represent a specific value or on/off state. The executing action 320 may include another kind of information describing the action of the device in addition to the action parameter 323 and the set value 324. For example, in order to allow triggering two or more actions simultaneously, executing action 320 may include information of the number of executing actions to be triggered. The executing actions described above are only presented for convenience of explanation, and the executing action 320 may contain further information that may be apparent from the above descriptions to those of ordinary skill in the art.

Referring back to FIG. 2, the controller 120 or 160 selects, in operation 220, at least one of the devices 122A-122N or 162A-162M, respectively, based on the received service rule. As described above, the service rule 300 contains information in a general form that can be used for selecting a device to which the service rule is to be applied rather than directly designating the device to which the service rule is to be applied. Thus, it may be necessary to select a device to be controlled based on the service rule 300. The device may be selected based on the device type 311 or 321 and/or the device location 312 or 322 included in the service rule 300.

The controller 120 or 160 may select a device of a device type corresponding to the device type 311 or 312 from among the plurality of devices 122A-122N or 162A-162M, respectively, connected to the controller 120 or 160. That is, the controller 120 or 160 may select a device to which the trigger condition and the executing action contained in the service rule 300 are applicable. For example, when there is a trigger condition of 'if the temperature is greater than or equal to 29 degrees', the controller 120 or 160 may determine whether the temperature sensor, which is a temperature-related device, or another device equipped with temperature sensors, such as an air conditioner or a heater, satisfy the trigger condition. In other words, the controller 120 or 160 may select a device which may be tested for satisfying the trigger condition based on the device type. The devices that are irrelevant to temperature such as a table gas range and doors are unrelated to the trigger condition above and cannot be tested for satisfying the trigger condition even when such devices are selected by a controller, and thus are excluded from the selection. As another example, in the case that the executing action involves an action of 'cooling', devices related with cooling operations such as an air conditioner and a fan may be selected to execute the cooling action. Thus, the controller 120 or 160 may select a device that can execute the action based on the device type. The devices that are irrelevant to cooling such as an electric light and a window are unrelated to executing the cooling action and cannot execute the action even when such devices are selected by a controller, and thus are excluded from the selection.

The controller 120 or 160 may select a device, from among the plurality of devices 122A-122N or 162A-162M, respectively, that is installed at a location corresponding to the device location 312 or 322. For example, if the trigger condition and the executing action contained in the service rule 300 are related with an electric light installed in the 'living room', the electric light in the living room is tested for the trigger condition or is controlled to execute the action. The electric lights installed at other places such as the bathroom and the bedroom are unrelated to the trigger condition or the executing action, and cannot be tested for satisfying the trigger condition or execute the action even when such devices are selected by a controller, and thus are excluded from the selection.

The controllers 120 and 160 may store other information about the devices 122A-122N and 162A-162M, respectively, connected to the controllers 120 and 160. Such information may be stored and maintained as a device list, so that the controller 120 or 160 selects a proper device from the device list.

FIG. 4 is a table showing device information 400 stored in the controller 120 or 160 according to an exemplary embodiment.

Referring to FIG. 4, the device information 400 includes device type information and device location information for all the devices having device IDs of A through Z. If the device type 311 or 321 in the received service rule 300 is set to 'refrigerator', the device B may be selected by a controller. If the device location 312 or 322 in the received service rule 300 is set to 'living room', the devices A and C may be selected by a controller. If the device type 311 or 321 is set to 'refrigerator' and the device location 312 or 322 is set to 'living room', no devices may be selected by a controller. The device information described above is only presented for convenience of explanation, and the device information 400 may further include information that may be apparent from the above descriptions to those of ordinary skill in the art.

Referring back to FIG. 2, in operation 230, the controllers 120 and 160 modify the received service rule 300 to control the selected device. The service rule 300 contains information in a general form as described above, and the service rule 300 should be modified into a form that can be applied to the device selected in operation 320. The modified service rule has a form that can control a relevant device.

Figure 5:
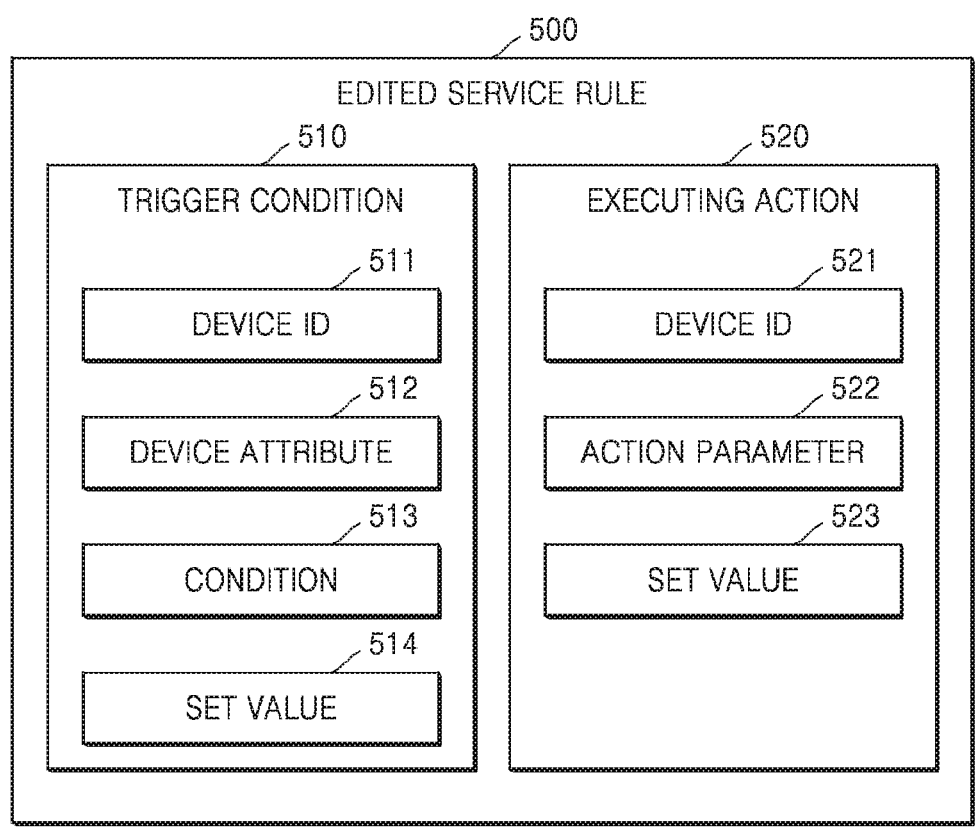
FIG. 5 is a schematic diagram illustrating a modified service rule according to an exemplary embodiment.

FIG. 5 illustrates a modified (edited) service rule 500 according to an exemplary embodiment.

The modified service rule 500 includes trigger condition 510 and executing action 520. The trigger condition 510 includes information about a trigger condition under which the executing action is triggered. The executing action 520 contains information about an action to be executed when the trigger condition is satisfied. Thus, the modified service rule 500 includes both the trigger condition 510 and the executing action 520 corresponding to the trigger condition 510.

According to an exemplary embodiment, the device type 311 in the trigger condition 310 of the received service rule 300 may be changed into a device ID of the particular device selected by a controller. For example, if a window in the living room listed in FIG. 4 is selected, the device type 311 in the received service rule 300 is changed into the device ID of a value of 'C' in the modified service rule 500. Through such a process, a device to be controlled is specified in the modified service rule 500. Also, device action information corresponding to the trigger condition in the received service rule 300 may be changed into a control command for controlling the selected device. For example, if a motion sensor is selected in operation 220, the information of the motion sensor operation may be changed into a control command for controlling the motion sensor to 'detect motion greater than a certain level' (e.g., a predetermined speed), for example.

According to an exemplary embodiment, the device type 321 in the executing action 320 of the received service rule 300 may be changed into a device ID of the particular device selected by a controller. For example, if an electric light window in the bathroom listed in FIG. 4 is selected, the device type 321 in the received service rule 300 is changed into the device ID of a value of 'Z' in the modified service rule 500. Through such a process, a device to be controlled is specified in the modified service rule 500. Also, device action information corresponding to the executing action in the received service rule 300 may be changed into a control command for controlling the selected device. For example, if an air conditioner is selected in operation 220, the information of the air conditioner operation may be changed into a control command for controlling the air conditioner to 'turn on and set the target temperature to 39 degrees', for example.

Referring back to FIG. 2, according to an exemplary embodiment, the service rule may be modified based on specifications of the selected device. Here, the specifications of the device may include other information such as identification information and technical information, and so on. The identification information may be, for example, a device name or a device ID for identifying the device. The technical information represents technical specifications of hardware and software of the device, and may include hardware type, operating speed, operating condition, performance, operating system, software, and so on. Also, the specifications of the device may include the device information 400 shown in FIG. 4, or be included in the device information 400. The controllers 120 and 160 may edit the received service rule 300 to be in accord with the hardware and software of the selected device based on the specifications of the device.

There may exist some information that does not need to be modified in the service rule 300. For example, the device attribute 313, the condition 314, the set value 315 in the trigger condition 310, and the action parameter 323 and the set value 324 may be applied to the selected device without any change while the service rule 300 is modified. Such information may be used in the modified service rule 500 without any change. In other words, the device attribute 313, the condition 314, the set value 315 in the trigger condition 310, and the action parameter 323 and the set value 324 in the executing action 320 of the service rule 300 may be used as the device attribute 512, the condition 513, the set value 514 in the trigger condition 510, and the action parameter 522 and the set value 523 in the executing action 520, respectively, of the modified service rule 500. However, such information might be modified, if necessary or desired, into a proper form for controlling the selected device depending on the specifications information.

In operation 240, the controllers 120 and 160 control the selected device using the modified service rule 500. As described above, the modified service rule 500 has a form suitable for controlling each device. Also, the modified service rule 500 may include a control command for controlling each device. According to an exemplary embodiment, the controllers 120 and 160 may transmit the control command to the selected device. The controllers 120 and 160 may control the selected device through the control command.

A device that is an object in determination of the trigger condition may be the same as the device that performs the executing action. However, the former may be a separate device from the latter. For example, with respect to an air conditioner, the controllers 120 and 160 may determine whether the trigger condition is satisfied based on current temperature that is measured by an internal temperature sensor equipped in the air conditioner to control the operation of the air conditioner. Assuming that the trigger condition is 'temperature is greater than or equal to 29 degrees', for example, if the current temperature measured by the internal temperature sensor is 32 degrees, the trigger condition is satisfied. Here, the controllers 120 and 160 may set the target temperature of the operating air conditioner to 29 degrees according to the executing action 520. If there is a temperature sensor provided separately from the air conditioner, the controllers 120 and 160 may determine whether the trigger condition is satisfied based on current temperature that is measured by the separate temperature sensor to control the operation of the air conditioner. Assuming again that the trigger condition is 'temperature is greater than or equal to 29 degrees', for example, if the current temperature measured by the separate temperature sensor is 32 degrees, the trigger condition is satisfied. Here, the controllers 120 and 160 may turn on the air conditioner according to the executing action 520.

The controllers 120 and 160 may determine whether the trigger condition is satisfied, and control the selected device to perform the executing action corresponding to the trigger condition when the trigger condition is satisfied. The controllers 120 and 160 may check the device ID 511 from the condition 510 in the modified service rule 500, check the properties of the device from the device properties 512, and determine whether the trigger condition is satisfied with reference to the condition 513 and the set values 514.

Further, the controllers 120 and 160 may determine whether the trigger condition is satisfied in various ways. In an exemplary embodiment, the controllers 120 and 160 may transmit a state check request message to the device, find the current state of the device after receiving a response from the device, and then determine whether the current state of the device satisfies the trigger condition. Here, the controllers 120 and 160 may transmit the state check request message according to a frequency set previously or at a designated time set previously. For example, if the device is a temperature sensor and the trigger condition is 'temperature is greater than or equal to 29 degrees', the controllers 120 and 160 may transmit to the temperature sensor a message requesting the current temperature, receive the temperature measured by the temperature sensor, and control a device such as the air conditioner to perform the executing action when the temperature is greater than or equal to 29 degrees.

In another exemplary embodiment, the controllers 120 and 160 may transmit a control command to the device for controlling the device to send a notification message when the current state of the device reaches a certain level, and determine whether the current state of the device satisfies the trigger condition upon receiving the notification message. For example, if the device is a temperature sensor and the trigger condition is 'temperature is greater than or equal to 29 degrees' as above, the controllers 120 and 160 may transmit a control command to the temperature sensor for controlling the temperature sensor to send a notification message when the temperature is greater than or equal to 29 degrees. The temperature sensor may send the notification message to the controllers 120 and 160 when the temperature is greater than or equal to 29 degrees, and the controllers 120 and 160 may determine whether the trigger condition is satisfied. The methods of determining satisfaction of the trigger condition described above are only presented for convenience of explanation, and the controllers 120 and 160 may determine whether the trigger condition is satisfied in various ways that may be apparent to those of ordinary skill in the art from the above description.

As described above, the controllers 120 and 160 may receive the service rule described in a general form and modify the received service rule into a form suitable for controlling each device. Thus, the service rules are applicable to any environment and sharable between systems, and enhance universality and convenience.

After operation 240, the controllers 120 and 160 may update the trigger condition and the executing action contained in the modified service rule based on actually executed actions. That is, the controllers 120 and 160 may modify the modified service rule to be better suited to the current environment by use of information acquired during the course of applying the service rule. Such a process may be carried out by using a machine learning algorithm.

Figure 6:
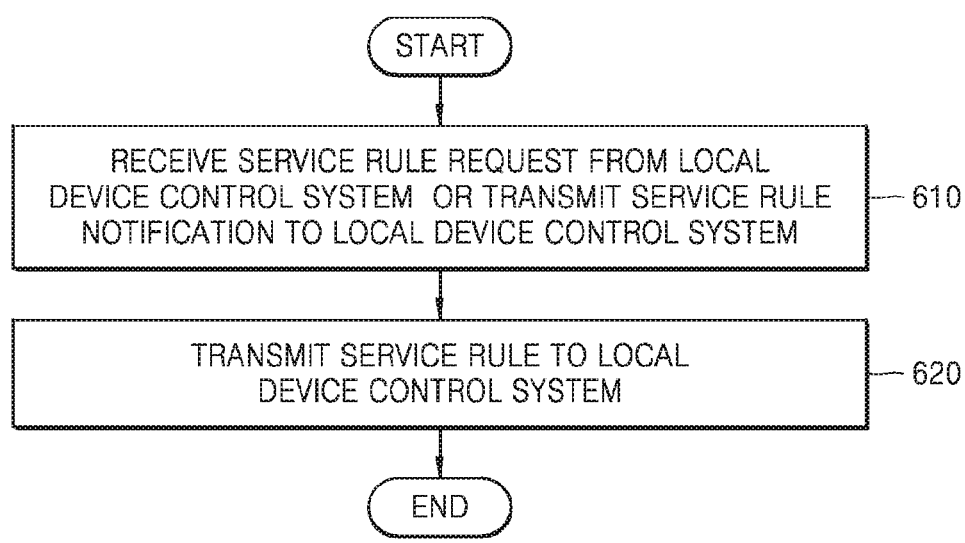
FIG. 6 is a flowchart showing an operation of a server according to an exemplary embodiment.

FIG. 6 is a flowchart showing an operation of the server according to an exemplary embodiment.

In operation 610, the server 130 receives a service rule request from the local device control system 110 or 150, or transmits a service rule notification to the local device control system 110 or 150. The service rule notification is a notice informing the local device control system 110 or 150 that there is a service rule that can be provided to the local device control system 110 or 150.

According to an exemplary embodiment, the server 130 stores at least one service rule 300, and may provide the service rule 300 stored therein in a form of a list. The server 130 may receive the service rule request from the local device control system 110 or 150, or transmit the service rule notification to the local device control system 110 or 150.

In operation 620, the server 130 transmits the service rule to the local device control systems 110 and 150. To summarize, the server 130 may transmit the service rule to the local device control systems 110 and 150 in response to the request from the local device control systems 110 and 150 or according to the needs or conditions of the server 130.

A user may conveniently control the local device control systems 110 and 150 by controlling the server 130 to transmit the service rule notification to a plurality of local device control systems 110 and 150 and inducing the plurality of local device control systems 110 and 150 to receive the service rule. For example, assuming that the local device control systems 110 and 150 are hotel room management systems established in a hotel, each room of the hotel may be equipped with the same device at the same location as the other rooms, and be equipped further with the controller 120 or 160. A hotel administrator may manage the hotel rooms simultaneously by controlling the server 130 to transmit the service rule notification to the local device control systems 110 and 150 in the rooms to induce the local device control systems 110 and 150 to receive the service rule.

Figure 7:
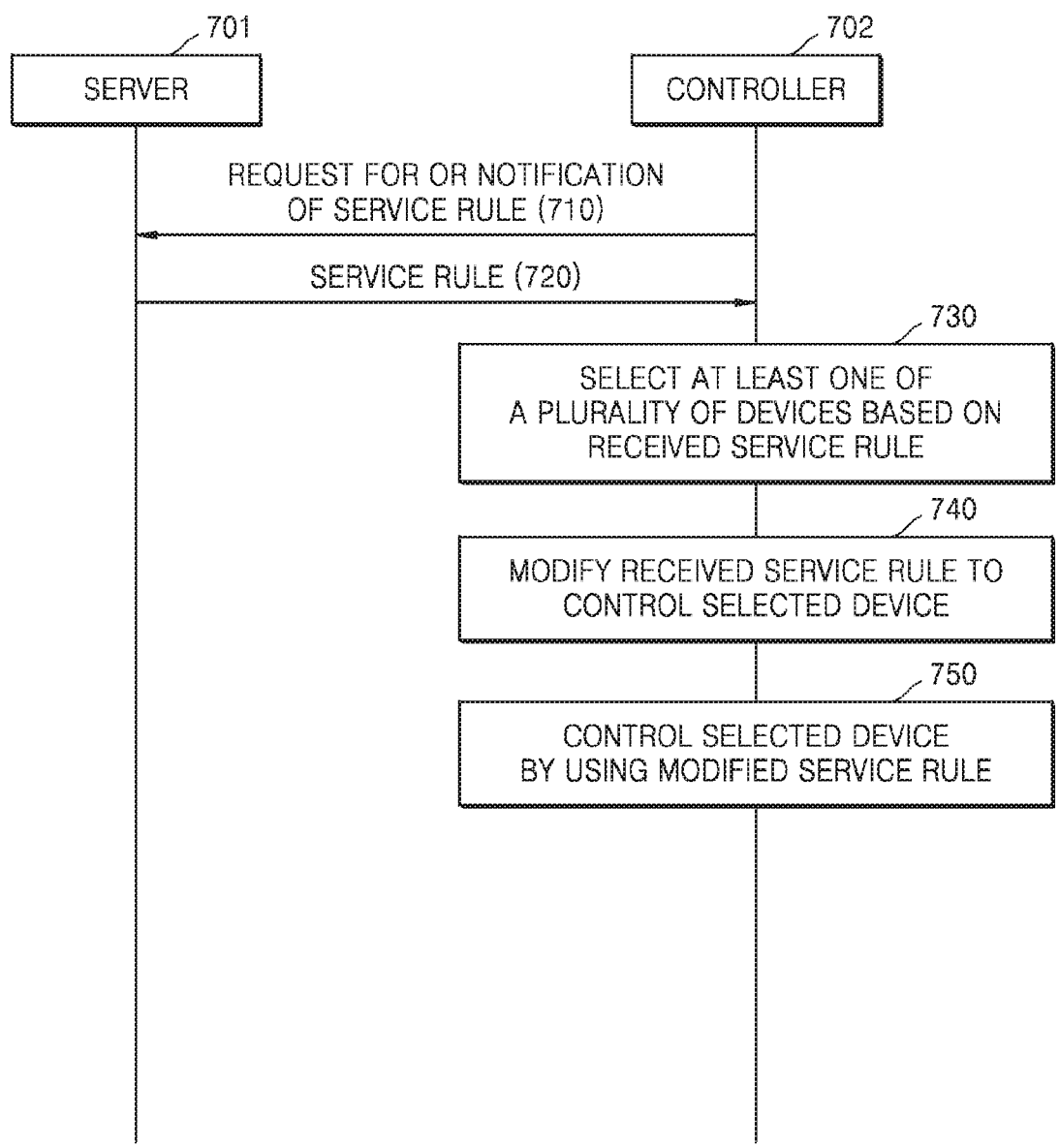
FIG. 7 is a flowchart showing an operation of a device control system according to an exemplary embodiment.

FIG. 7 is a flowchart showing an operation of a device control system according an exemplary embodiment. With regard to FIG. 7, descriptions which repeat those descriptions presented above will be omitted for simplicity.

In operation 710, a control apparatus 702 (e.g., controller) transmits a service rule request to a server 701 or receives a service rule notification from the server 701. In operation 720, the control apparatus 702 receives the service rule from the server 701. According to an exemplary embodiment, the server 701 may include another controller in addition to the control apparatus 702. In such a case, the control apparatus 702 may access the other controller to receive the service rule. That is, the service rule is transmitted through a direct communication between the controllers.

The control apparatus 702 selects one of a plurality of devices connected to the control apparatus 702 in operation 730, modifies the received service rule to control the selected device in operation 740, and controls the selected device by using the modified service rule in operation 750.

Figure 8:
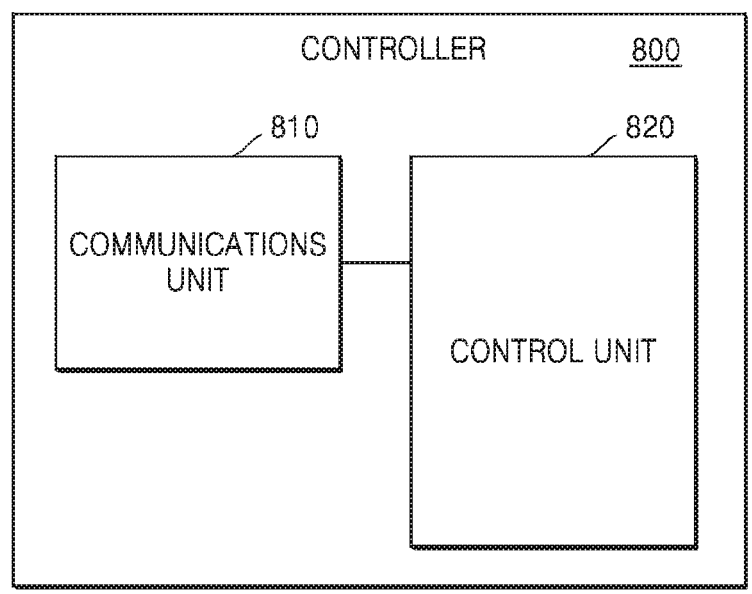
FIG. 8 is a block diagram of a controller according to an exemplary embodiment.

FIG. 8 is a block diagram of a controller according to an exemplary embodiment. The controller shown in FIG. 8 includes a communicator 810 and a controller 820 (control unit 820).

The communicator 810 performs a function of communicating with external apparatuses. The communicator 810 is connected to a wired or wireless network to perform communications with external apparatuses though the network. For example, the communicator 810 may include a near field communications module, a mobile communications module, a wireless Internet module, and a wired Internet module such as an Ethernet adapter. Also, the communicator 810 may include one or more subcomponents.

According to an exemplary embodiment, the communicator 810 may communicate with a server to receive the service rule 300 from the server, representing the trigger condition and executing action corresponding to the trigger condition. The service rule is information for the control apparatus 800 to control the devices, and may be configured such that, when a certain condition is satisfied, the device corresponding to the condition executes an action designated by the service rule. The service rule 300 may contain the device types 311 and 321 and/or the device locations 312 and 322. The device types 311 and 321 represent types of devices, and the device locations 312 and 322 represent where the devices are located in the local device control systems 110 and 150.

Also, the communicator 810 may communicate with the devices.

The controller 820 controls overall operations of the control apparatus 800, and controls the devices connected to the control apparatus 800 by controlling the communicator 810. The controller 820 may include a processor, a RAM temporarily storing a signal or data received externally and corresponding to various operations carried out in electronic devices, and a ROM storing a control program for controlling the controller 820 and peripherals. The processor may be implemented by a System-on-Chip (SoC) semiconductor in which a core and a graphics processing unit (GPU) is incorporated.

The controller 820 may select at least one of the plurality of devices connected to the control apparatus 800 based on the received service rule 300, modify the received service rule 300 to control the selected device, and control the selected device by using the modified service rule 500. The service rule 300 received from the server contains information that can be used for selecting a device to which the service rule is to be applied rather than directly designating a particular device to which the service rule is to be applied. Thus, it may be necessary to select a device to be controlled based on the service rule 300. The device may be selected based on the device type 311 or 321 and/or the device location 312 or 322 contained in the service rule 300. Next, the service rule 300 should be modified into a form that can be applied to the selected device (although it is understood that the service rule 300 is not required to be modified in all situations). That is, the modified service rule has a form that can control a relevant device. According to an exemplary embodiment, the control apparatus 800 may receive the service rule described in a general form and modify the received service rule into a form suitable for controlling each device. Thus, the service rules are applicable to any environment and sharable between systems, and enhance universality and convenience.

According to an exemplary embodiment, the controller 820 may select a device, from among a plurality of devices connected to the control apparatus 800, based on the device type 311 or 312 and/or the device location 312 or 322. The device types 311 and 312 and/or the device locations 312 and 322 may be included in the trigger condition 310 and the executing action 320, respectively, or in the service rule 300 separately from the trigger condition 310 and the executing action 320.

According to an exemplary embodiment, the controller 820 may change the device type information in the trigger condition contained in the received service rule 300 into a device ID of the selected device. Also, the controller 820 may change device action information corresponding to the trigger condition contained in the received service rule 300 into a control command for controlling the selected device.

According to an exemplary embodiment, the controller 820 may change the device type information in the executing action contained in the received service rule 300 into a device ID of the selected device. Also, the controller 820 may change the device action information corresponding to the executing action contained in the received service rule 300 into a control command for controlling the selected device.

According to an exemplary embodiment, the controller 820 may modify the service rule 300 based on specifications of the selected device. The specifications of the device may include other information such as identification information and technical information, and so on. The specifications of the device may include many different types of information related to hardware and software features of the device.

According to an exemplary embodiment, the controller 820 may determine whether the trigger condition is satisfied and, if the trigger condition is satisfied, control the selected device to perform the executing action corresponding to the satisfied trigger condition. Also, the controller 820 may transmit a control command to the selected device.

Figure 9:
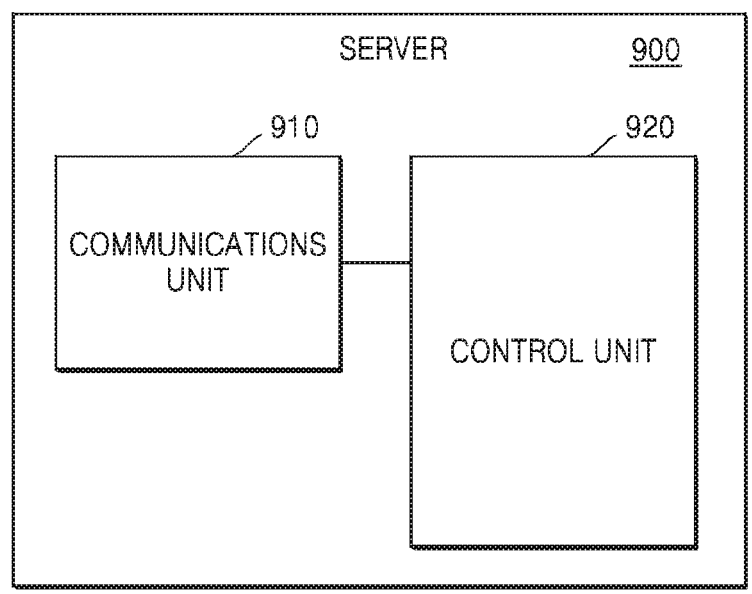
FIG. 9 is a block diagram of a server according to an exemplary embodiment.

FIG. 9 is a block diagram of a server according to an exemplary embodiment. The server shown in FIG. 8 includes a communicator 910 and a controller 920.

The communicator 910 performs a function of communicating with external apparatuses. The communicator 910 is connected to a wired or wireless network to perform communications with external apparatuses though the network. For example, the communicator 910 may include a near field communications module, a mobile communications module, a wireless Internet module, and a wired Internet module such as an Ethernet adapter. Also, the communicator 910 may include one or more subcomponents.

According to an exemplary embodiment, the communicator 910 may communicate with the control apparatus 800 to receive a service rule request from the control apparatus 800 or transmit a service rule notification to the control apparatus 800. Also, the communicator 910 may transmit the service rule to the control apparatus 800. The server 900 may further include a storage device for storing the service rule 300.

The controller 920 controls overall operation of the control apparatus 900, and controls the communicator 910 to transmit the service rule 300 to the control apparatus 800. The controller 920 may include a processor, a RAM temporarily storing a signal or data received externally and corresponding to various operations carried out in electronic devices, and a ROM storing a control program for control the controller 820 and peripherals. The processor may be implemented by a System-on-Chip (SoC) in which a core and a graphics processing unit (GPU) is incorporated. Also, the processor may be provided plurally (e.g., a plurality of processors) or may include a plurality of cores (e.g., single multi-core processor).

According to an exemplary embodiment, the control apparatus 900 may transmit the service rule 300 to the control apparatus 800 in response to a request from the control apparatus 800 or in response to other conditions, e.g., internal conditions of the control apparatus 900.

The methods and apparatuses for controlling devices according to another exemplary embodiment will now be described below.

Figure 10:
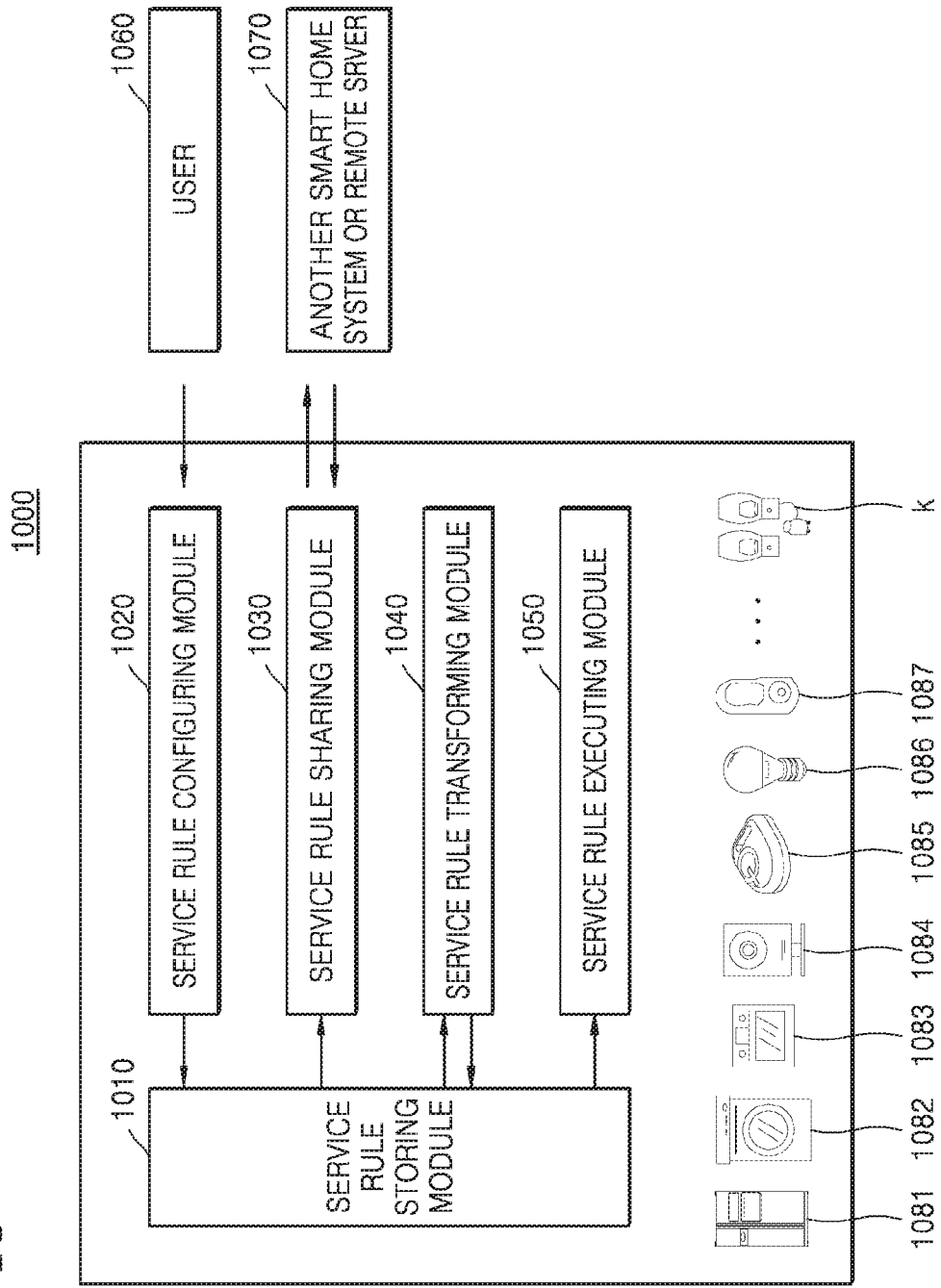
FIG. 10 is a schematic diagram of a device control system according to another exemplary embodiment.

FIG. 10 illustrates a device control system according to another exemplary embodiment.

The device control system 1000 includes a service rule storing module 1010 (e.g., service rule storage), a service rule configuring module 1020 (e.g., service rule configurer), a service rule sharing module 1030 (e.g., service rule sharer), a service rule transforming module 1040 (e.g., service rule transformer), and a service rule executing module 1050 (e.g., service rule executor), and may communicate with a user, another smart home system, or a remote server 1070.

It is assumed, for example, that the device control system described below is a smart home system that controls premises devices. Although FIG. 10 exemplarily illustrates the overall configuration of the overall device control system, each module may operate in a separate apparatus different from the other modules. For example, the service rule configuring module 1020 may operate on a smart home system A while the service rule transforming module 1040 operates on anther smart home system B.

The service rule storing module 1010 stores and calls service rules of a smart home system. A storage medium used for storing the service rule includes, but is not limited to including, a memory, a database and a file system. According to an exemplary embodiment, the service rule includes a service rule template and a service rule instance. The service rule template corresponds to the service rule described above, and includes fields for defining the service rule, and field values. The service rule instance corresponds to the modified service rule described above, and includes fields for controlling devices, and field values. Each of the service rule template and the service rule instance include one or more trigger conditions and one or more executing actions.

Figure 11:
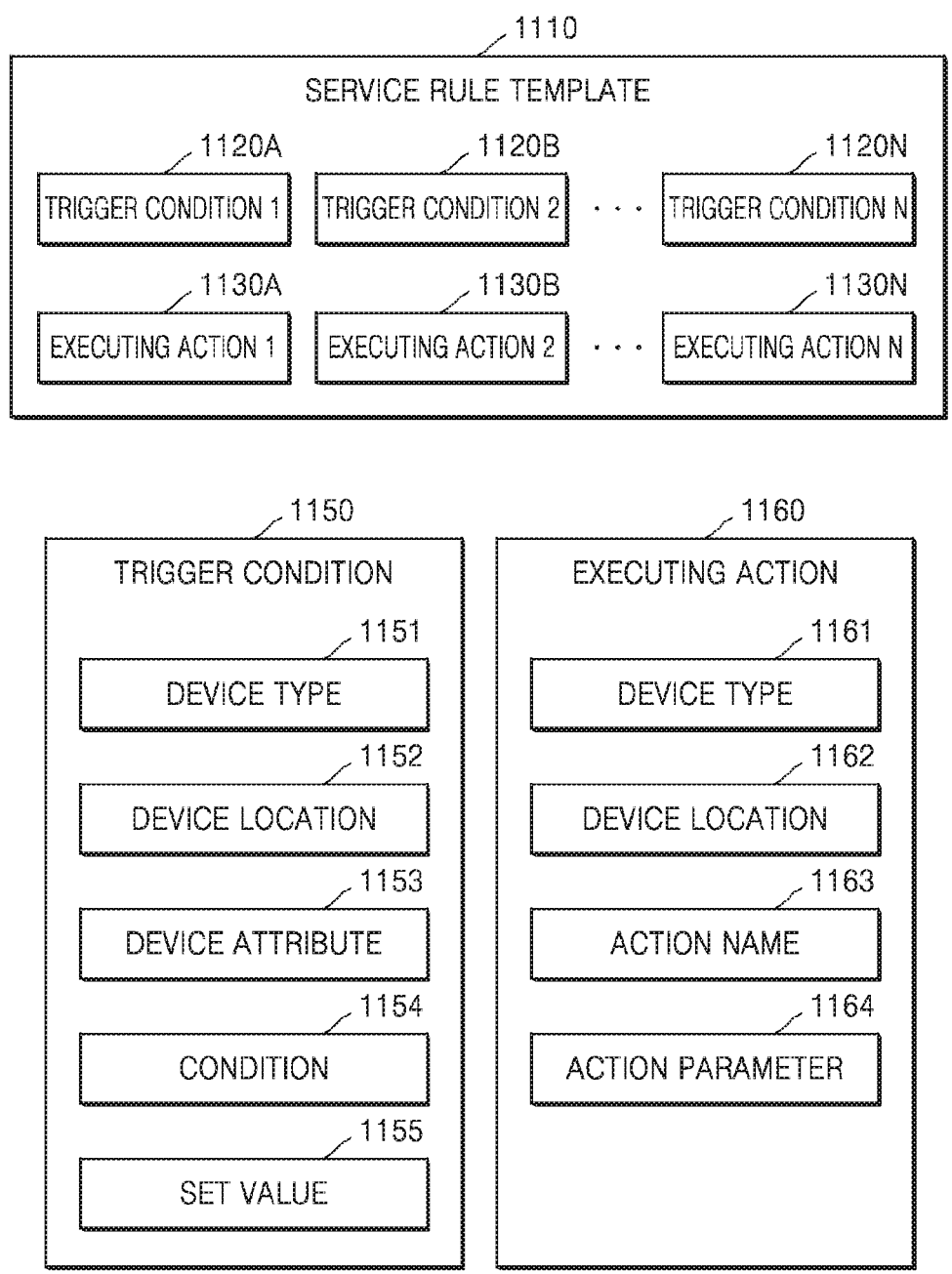
FIG. 11 is a schematic diagram illustrating a service rule template according to an exemplary embodiment.

FIG. 11 illustrates contents of the service rule template according to an exemplary embodiment.

As described above, the service rule template 1110 includes one or more trigger conditions 1120A-1120N and one or more executing actions 1130A-1130N. In the service rule template 1110, the trigger condition 1150 may include a device type 1151, a device location 1152, a device attribute 1153, a condition 1154, and/or a set value. 1155. The executing action 1160 includes a device type 1161, a device location 1162, an action name 1163, and/or an action parameter 1164. It is understood that other types of information instead of or in addition to the types of information shown in FIG. 11 may be included in the trigger condition 1150 and the executing action 1160.

Figure 12:
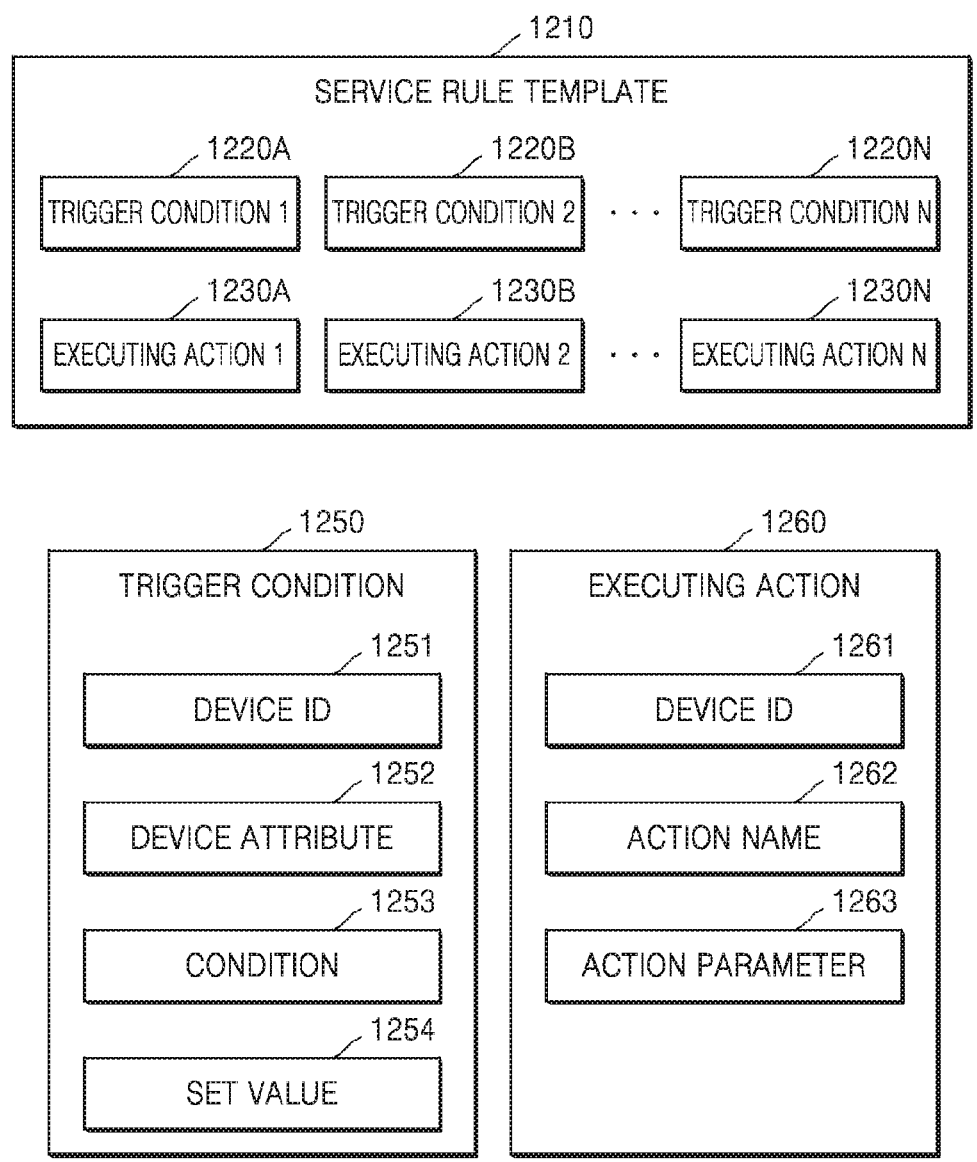
FIG. 12 is a schematic diagram illustrating a service rule instance according to an exemplary embodiment.

FIG. 12 illustrates contents of a service rule instance according to an exemplary embodiment.

As described above, the service rule instance 1210 includes one or more trigger conditions 1220A-1220N and one or more executing actions 1230A-1230N. In the service rule instance 1210, the trigger condition 1250 may include a device ID 1251, a device attribute 1252, a condition 1253, and/or a set value 1254. The executing action 1260 includes a device ID 1261, an action name 1262, and/or an action parameter 1263. It is understood that other types of information instead of or in addition to the types of information shown in FIG. 12 may be included in the trigger condition 1250 and the executing action 1260.

In the smart home system according to an exemplary embodiment, each of the plurality of service rules is independent from each other and not affected by the other service rules. Within a service rule 1110 or 1210, the plurality of trigger conditions 1120A-1120N or 1220A-1220N may be combined through as logic 'and' or logic 'or' operation. That is, when any one of the trigger conditions is satisfied or when all the trigger conditions are satisfied, corresponding executing action 1160 or 1260 is executed.

The device type 1151 in the trigger condition 1150 may refer to a service provider that provides a certain smart home context. The service provider may be a physical device such as a smart bulb that emits light, or may be a logical device such as a system module that provides time information.

Both the device types 1151 and 1161 in the trigger condition 1150 and the executing action 1160, respectively, may refer to one kind of device. For example, the device type of an electric light may refer to all of the electric lights in a certain room.

The service rule configuring module 1020 shown in FIG. 10 may provide device information, location information, and context information, and receive user input from the user 1060 to generate the service rule template 1110. The context information refers to state information of a group, or a variable that is related to a current application in an environment of the control system. The context information may change a system action directly or by attracting a user's attention to request the user to perform an action which will thereby affect the system action. Smart home devices and a smart home environment may be modeled based on the context information, and the service rules may be configured on the basis of the model, accordingly, so that the smart home system may be configured to more closely resemble actual user experiences.

By using a human-computer interface, a user may select an existing device type 1151 and/or 1161 to configure the trigger condition and the executing action, and input a rule identifier to configure a service rule template. When selecting the device type 1151 and/or 1161, the user may select a label in an option box or drag an icon.

Figure 13:
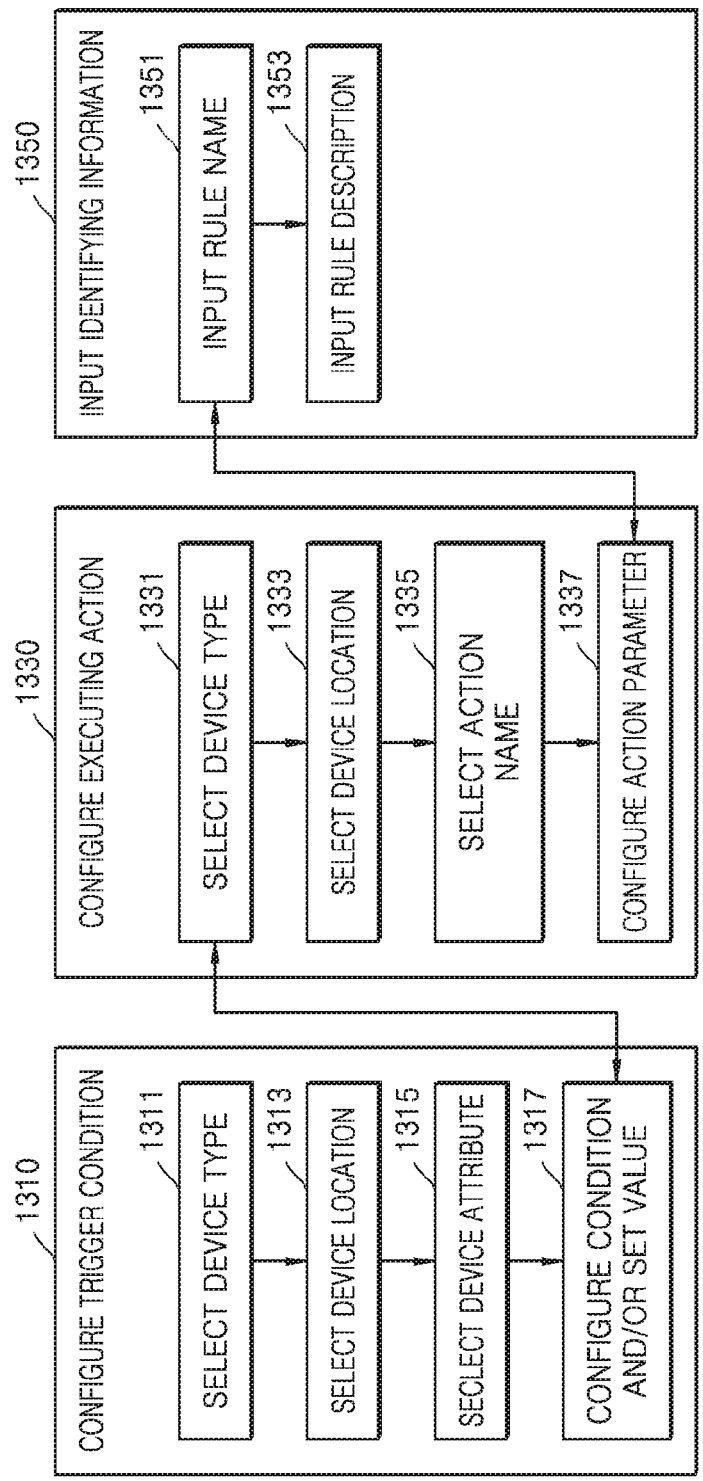
FIG. 13 is a flowchart illustrating a process of configuring a service rule template according to an exemplary embodiment.

FIG. 13 illustrates a process of configuring the service rule template according to an exemplary embodiment.

A trigger condition is configured in operation 1310, an executing action is configured in 1330, and identifying information is input in 1350.

In operation 1310, which is the operation of configuring the trigger condition, a device type is selected in operation 1311, a device location is selected in operation 1313, a device attribute is selected in operation 1315, and a condition and/or a set value is configured in operation 1317. Each field of the trigger condition 1150 in the service rule template 1110 may be filled with a value by performing operation 1310 once or repeatedly.

In operation 1330, which is an operation of configuring the executing action, a device type is selected in operation 1331, a device location is selected in operation 1333, an action name is selected in operation 1335, and an action parameter is configured in operation 1337. Each field of the executing action 1160 in the service rule template 1110 may be filled with a value by performing operation 1330 once or repeatedly.

In operation 1350, which is an operation of inputting identifying information, a rule name is input in operation 1351, and a rule description is input in operation 1353. Each field of the identifying information of the service rule template 1110 may be filled with a value by performing operation 1350 once or repeatedly.

The service rule sharing module 1030 shown in FIG. 10 enables a release, exchange, upload, download, import or export of the service rule template 1110, and further enables modification of a parameter of the service rule template 1110 after obtaining the service rule template 1110.

According to an exemplary embodiment, the service rule template 1110 may be released within an internal network or may be released to an external network. External smart home systems may discover or use the service rule template. In this mode, the local smart home system may include a Web server, and the external smart home systems may discover, check or directly use the released resources. The service rule template 1110 may be exchanged in a free or paid mode. The service rule sharing module 1030 may exchange the service rule template with the external smart home systems or a remote server. The smart home system may include or be linked to a system for purchasing or commenting on external merchandises. Many different types of electronic commerce may be used to facilitate the exchange of the service rule template 1110, and many different networks, ranging from local networks to the global Internet, may be employed to facilitate the exchange of the service rule template 1110.

According to an exemplary embodiment, the service rule template 1110 may be uploaded to the remote server or downloaded from the remote server. Also, the service rule template 1110 may be exported to be transformed into a data form that may be stored in a portable storage medium. Such data may be imported to be used again as the service rule template 1110. A structure and an interaction mode of the service rule sharing module 1030 will be described with reference to FIG. 14.

Figure 14:
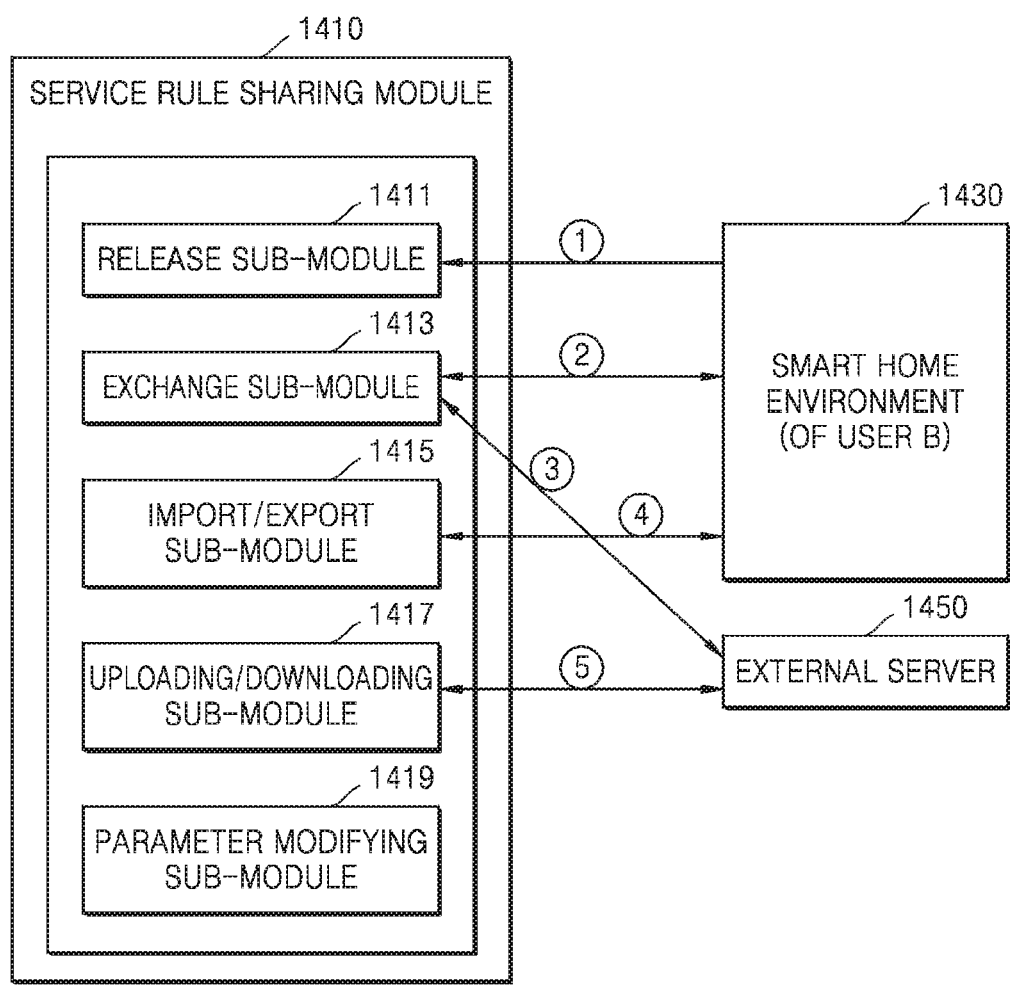
FIG. 14 is a schematic diagram illustrating a structure and interoperable modes of a service rule sharing module according to an exemplary embodiment.

FIG. 14 illustrates the structure and interoperable modes of the service rule sharing module according to an exemplary embodiment.

The service rule sharing module 1410 may include functional sub-modules. Specifically, the service rule sharing module 1410 may include a release sub-module 1411, an exchange sub-module 1413, an import/export sub-module 1415, an uploading/downloading sub-module 1417, and a parameter modifying sub-module. The service rule sharing module 1410 may communicate with another smart home environment 1430, and an external server 1410. The various sub-modules shown in FIG. 14 may be implemented as software, hardware, or a combination thereof. For example, the various sub-modules may be implemented as specially configured hardware processors designed to perform the respective functions of the sub-modules.

According to an exemplary embodiment, the service rule sharing module 1410 may provide five interoperable modes: (1) Allowing an external smart home system such as the smart home system 1430 to discover and use a service rule through the release sub-module 1411, (2) Selecting a service rule in the external smart home system 1430 and exchanging the selected service rule with the external smart home 1430 by using the exchange sub-module 1413, (3) Selecting a service rule in an external server 1450 and exchanging the selected service rule with the external server 1450 by using the exchange sub-module 1413, (4) Importing a service rule from the external smart home system such as the smart home system 1430 or exporting a service rule to the external smart home system by using the import/export sub-module 1415, and (5) Downloading and uploading a service rule from and to the external server 1450 by using the uploading/downloading sub-module 1417.

To summarize, the service rule template 1110 may be shared between smart home systems and a remote server, and sharing modes include a Client-to-Client (C2C) mode for directly sharing between smart home systems, a Business-to-Client (B2C) mode for sharing between a smart home system and a remote server, and a Business-to-Business (B2B) mode for sharing between remote servers. Additionally, the exemplary embodiments are not limited thereto, and other arrangements which involve entities that are not clients or businesses may also be used in accordance with exemplary embodiments.

The service rule transforming module 1040 shown in FIG. 10 may transform a user-configured or shared service rule template 1110 into a service rule instance in an automatic mode or a semiautomatic mode. In the automatic mode, the service rule template 1110 may be identified instantly according to the device type and the device location. In the semiautomatic mode, the user may need to select the device instance from the service rule template.

Figure 15:
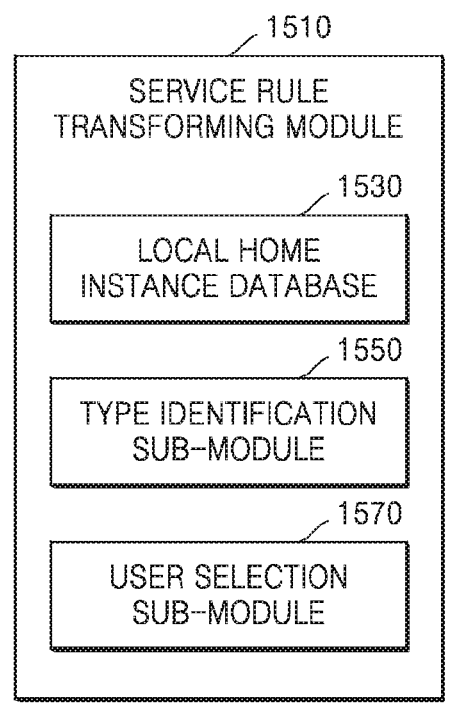
FIG. 15 is a schematic diagram illustrating a service rule transforming module according to an exemplary embodiment.

FIG. 15 illustrates a structure of the service rule transforming module according to an exemplary embodiment. The service rule transforming module 1510 may include a local home instance database 1530, a type identification sub-module 1550, and a user selection sub-module 1570.

The local home instance database 1530 may include two mapping relations. One mapping relation is a mapping relation between the device type and existing devices in a current environment, and the other mapping relation is a mapping relation between the device location and rooms in the current environment. The mapping relations may be configured via three modes. In a first mode, the smart home provider may configure the mapping relations. In a second mode, after the smart home provider completes installation of the device and the service rule template and relevant information are automatically imported, the user may input individual information to configure the mapping information. In a third mode, the user may configure the mapping relations.

Figure 16:
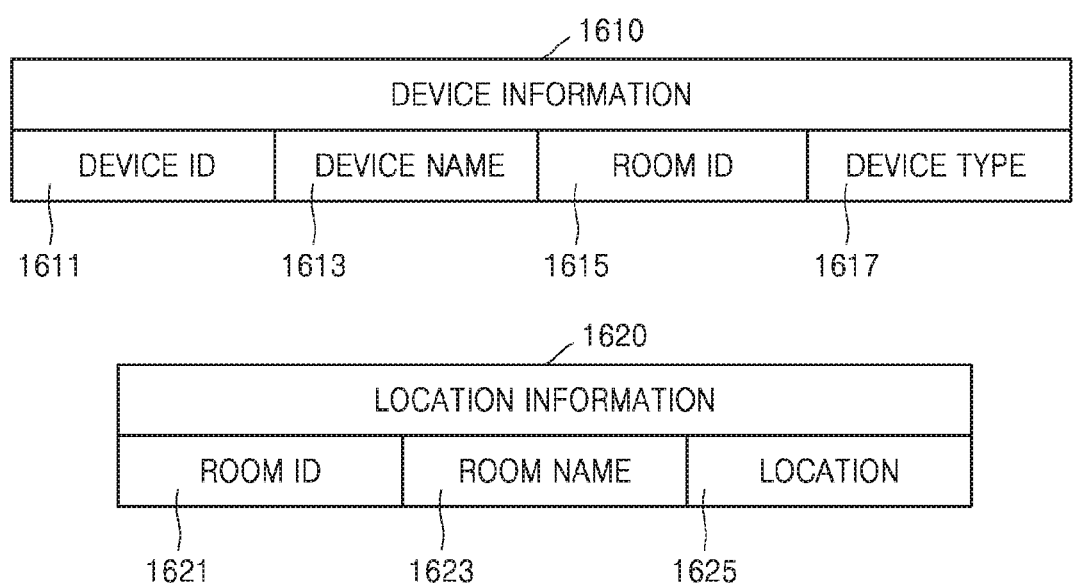
FIG. 16 is a schematic diagram illustrating a local home instance database format according to an exemplary embodiment.

FIG. 16 illustrates table and field structures of the local home instance database 1530 according to an exemplary embodiment.

The local home instance database 1530 may include a device information table 1610 and a device location information table 1620. The information table 1610 may include fields of: device ID 1610, device name 1613, room ID 1615, and device type 1617. The device location information table 1620 may include fields of: room ID 1621, room name 1623, and location 1625. The database structure described above is presented for exemplary purposes only, and the structure may further include various fields within a scope that may be apparent to those of ordinary skill in the art from the above description.

Referring back to FIG. 15, the type identification sub-module 1550 replaces the device type 1151 and the device location 1152 in the service rule template 1110 with a certain device ID 1251 in the service rule instance 1210. If there are plural objects to be replaced, the user selection sub-module 1570 is triggered so that the user may select one or more matched objects from the local home instance set.

Figure 17:
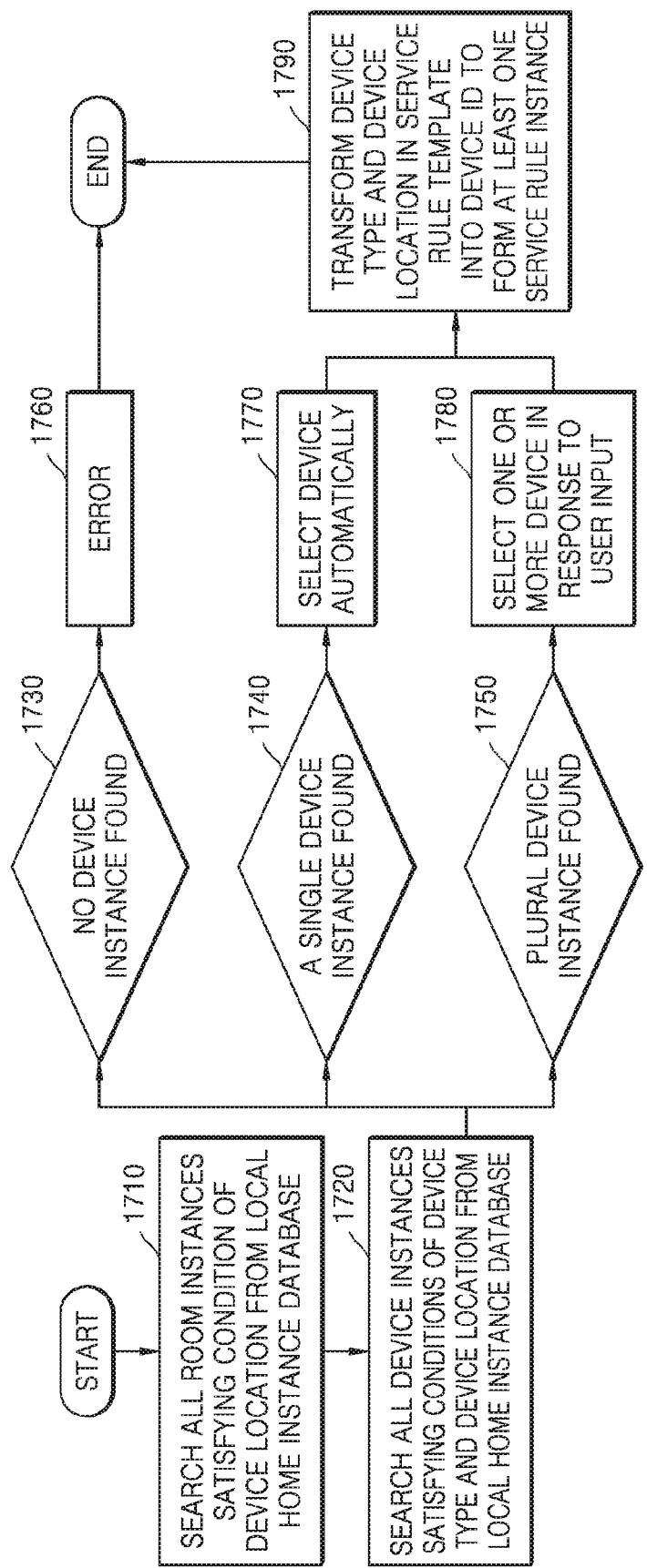
FIG. 17 is a flowchart illustrating a process of transforming a service rule template into a service rule instance according to an exemplary embodiment.

FIG. 17 illustrates a process of transforming the service rule template into the service rule instance according to an exemplary embodiment.

First, all room instances satisfying a condition of the device location are searched for within the local home instance database in operation 1710. Subsequently, all device instances satisfying conditions of the device type and the device location are searched for within the local home instance database in operation 1720. The search result may reveal no device instance found, a single instance, or a plurality of instances. If it is determined in operation 1730 that no device instance was found, there is no service rule template 1110 for transforming into the service rule instance 1210 and the process proceeds to operation 1760 to display an error message and terminate the process. If it is determined in operation 1740 that a single device instance was found, the process proceeds to operation 1770 and the device is selected automatically. If it is determined in operation 1750 that plural device instances were found, the process proceeds to operation 1780 and one or more devices are selected in response to user input (e.g., a user selecting one of the plural device instances on a control device such as a computer, a smart phone, etc.). Afterwards, the process proceeds to operation 1790 and the device type 1151 and the device location 1152 in the service rule template 1110 are transformed into the device ID 1251, so that at least one service rule instance is formed.

When the trigger condition in the service rule instance 1210 is satisfied, the service rule executing module 1050 shown in FIG. 10 automatically performs the executing action corresponding to the trigger condition for a specific device. Further, the service rule executing module 1050 may record log information.

Figure 18:
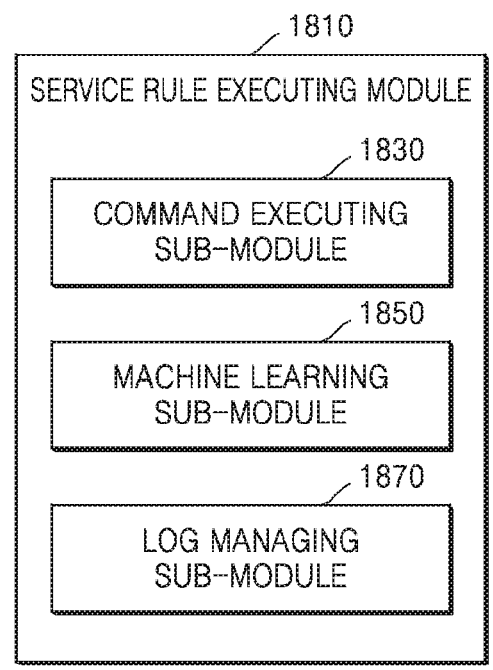
FIG. 18 is a schematic diagram illustrating a service rule transforming module according to an exemplary embodiment.

FIG. 18 illustrates a structure of the service rule transforming module according to an exemplary embodiment. The service rule executing module 1050 includes a command executing sub-module 1830, a machine learning sub-module 1850, and a log managing sub-module 1870. The various sub-modules shown in FIG. 18 may be implemented as software, hardware, or a combination thereof. For example, the various sub-modules may be implemented as specially configured hardware processors designed to perform the respective functions of the sub-modules.

The command executing sub-module 1830 may perform the executing action 1260 in the service rule instance 1210 when the smart home environment satisfies the trigger condition 1250 in the service rule instance 1210.

The machine learning sub-module 1850 may extract a user's behavioral habits from recorded log information according to a machine learning algorithm, and provide advice for adjusting the action parameter after obtaining a shared service rule template 1110.

The log managing sub-module 1870 records execution time, a device ID, an action name and action parameters of the executing action after the executing action is performed.

Figure 19:
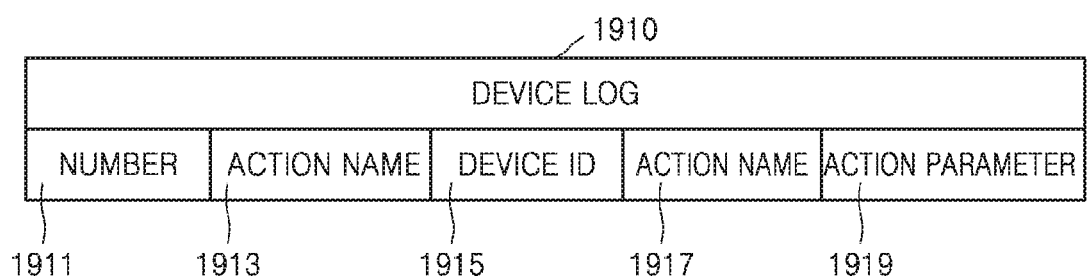
FIG. 19 is a schematic diagram illustrating a device log database format according to an exemplary embodiment.

FIG. 19 illustrates a field structure of a device log database according to an exemplary embodiment.

The device log 1910 may include fields of: number 1911, action name 1913, device ID 1915, device action name 1917, and device parameter 1917. The database structure described above is presented for exemplary purposes only, and the structure of the device log 1910 may be arranged in many other ways and may further include many other fields that may be apparent to those of ordinary skill in the art from the above description.

The exemplary embodiment described above provides systems and methods comprehensively utilizing the service rules that can be used to easily control the smart home system. Accordingly, the exemplary embodiment enhances the generality of the service rules and user convenience for the smart home system.

The operation of the smart home systems will now be described with detailed examples. However, descriptions repeating those descriptions presented above will be omitted for simplicity.

According to an exemplary embodiment, a user A may first configure a service rule template in a local smart home system. In order to make the configured service rule template popular and gain income, the user A may upload the service rule template to a service rule exchange network. A user B may directly download the service rule template after paying for the template, and use the service rule template in a smart home system of the user B.

This process will be described in more detail.

In the local smart home system, the user A may configure the service rule as necessary or desired. For example, the service rule may include a rule with the following conditions: 'If the door of the living room is open, the room is hot, and the time of day is after 6 o'clock (pm), turn on the electric light and the air conditioner in the living room.'

According to an exemplary embodiment, the service rule configuring module 1020 of the local smart home system may provide information of devices, locations, and contexts which may be chosen. These three kinds of information may be used for the user A to configure the service rule. However, this information is presented for exemplary purposes only, and another kinds of information may further be included within a scope that may be apparent to those of ordinary skill in the art. For example, the location may include: a sitting room, a main sitting room, an auxiliary sitting room, a kitchen, a living room, a living room 1, a living room 2, a bathroom, a bathroom 1, a bathroom 2, and a courtyard, as well as many other areas within and outside of a house. The device may include physical devices and logical devices which are software modules in the system. The physical devices may include: a door, light, an air conditioner, a refrigerator, a dishwasher, a cleaning robot, a security camera, a television, a thermometer, and a treadmill, along with many other types of appliances, such as washer/dryer, VCR, garage door, etc. The logic devices may include: time and home. The context may include, for example, door open or closed; electric light on; temperature of air conditioner; thermometer measures room temperature; date, hour, minute are all considered in time; whether the room is hot.

According to an exemplary embodiment, the user A may combine labels provided by the system by directly selecting labels in option boxes or dragging icons to configure the service rule template.

The trigger conditions configured by the user A may be: the state of the door of the living room is open, whether the room is hot is yes; time is after 1 o'clock, for example. The executing actions configured by the user may include: turning on an electric light of the living room, and turning on the air conditioner of the living room. The individual trigger conditions may go through logic 'and' operation as desired. The user A may input a service rule name additionally. An example of service rule template data configured as above is shown in FIG. 20.

FIG. 20 shows an example of a structured service rule template data according to an exemplary embodiment.

Referring to FIG. 20, the service rule template 2002 contains contents of each sub-structure shown in FIG. 11. The service rule template may be configured in XML codes. However, another structured data format may be used as well.

According to an exemplary embodiment, the identifier of the service rule may be represented uniquely by use of a Globally Unique Identifier (GUID) of 32 bits. Other modes for uniquely identifying the service rule may be used as well. Also, the smart home system may employ a file system or a database to store the service rule template in a disk or flash memory. Further, the smart home system may allow a user who desires a certain service rule template to perform a search for service rule templates by a simple search or a structured search in terms of at least one of: name, room, and device.

The user A may select a configured service rule template from the local smart home system, and upload the selected service rule template to an exchange network. The user B may find the service rule template on the exchange network, and download the service rule template to the smart home system of the user B after paying for it. The mode for sharing the service rule template as such is shown in FIG. 14.

After the user B acquires the service rule template, the local smart home may transform the service rule template into an executable service rule instance in the automatic mode or the semiautomatic mode.

FIG. 21 shows an example of home instance data, and FIG. 22 shows another example of the home instance data.

In the local home environment, each of the rooms and the devices may be uniquely represented by use of the GUID of 32 bits in an exemplary embodiment. Meanwhile, other kinds of modes may be used for uniquely identifying the rooms and the devices.

The smart home system may acquire a physical room corresponding to the living room according to the location information 2110, and acquire one door, two electric lights, and one air conditioner of the living room according to the device information 2120. Since, in this example, a single door and a single air conditioner exist, the instances related to such devices are selected automatically. In contrast, since, in this example, there are two electric lights, the system makes the user select at least one of the electric lights from the two or more electric lights. It is assumed here that the user B selects two electric lights. A structured service rule instance data is shown in FIG. 23.

FIG. 23 shows an example of service rule instance data according to an exemplary embodiment.

Referring to FIG. 23, the service rule instance data 2302 contains contents of each sub-structure shown in FIG. 12. The service rule instance may be configured in XML codes. However, another structured data format may be used as well.

The service rule instance may directly be associated with the devices in the local smart home system of the user B. When the trigger condition is satisfied, the executing actions are automatically executed by the service rule executing module 1810. Here, the relation to be applied to the plural trigger conditions of the service rule instance is logic 'and', and thus, the electric light and the air conditioner in the living room are turned on when the door is open, the room is hot, and the time is after 6 pm.

When the service rule instance is executed, device log data for the performing of the action is recorded.

FIG. 24 shows an example of the device log data according to an exemplary embodiment.

The machine learning sub-module 1850 obtains log data 2420 for the operations as a training data set, and may adjust the shared service rule template by configuring a forecast model using an algorithm such as linear regression algorithm. In the training data which machine learning sub-module 1850 uses for configuring the forecast model, the condition (e.g., eigenvalues) may include time, weather variables such as temperature and humidity, and so on, and the output may be the target temperature of the air conditioner. The target temperature may be configured by the user, the time when the target temperature is configured may be obtained from the user log data, and weather information may be acquired from any weather API. After the user uses the air conditioner for a period of time and the training data are accumulated to a certain amount, the forecast model may be configured and cross validation may be performed. If the error of the model is within an acceptable range, when the trigger condition is satisfied, the model may be used to forecast current target temperature, so that the air conditioner is automatically turned on for the user and the temperature of the air conditioner is set to a forecasted value. Algorithms other than the linear regression algorithm used in the machine learning field may be used to obtain user's behavioral habits from the log data.

According to another exemplary embodiment, the smart home system may operate in a following scenario. First, an administrator configures a room template. The room template may include a room type, a device type, and locations of the devices in the room. Next, the administrator configures a rule template for each room template. Afterwards, the administrator sends the rule template to all of the rooms of the same type at one time. Further, the smart home system of each room performs instantiation for the rule templates, and binds the device template with a certain device. At this time, since the room template is fixed, such operation may be implemented by automatic selection. For each room, when the trigger condition is satisfied, a corresponding action is executed automatically.

According to an exemplary embodiment, the service rules are specified in a general form so as to be applicable to any environment and sharable between systems, and may enhance universality and convenience.

The exemplary embodiments described above may be written into a computer-readable program, stored in a non-transitory computer-readable storage medium, and implemented in a general-purpose digital computer executing the program by use of the non-transitory computer-readable storage medium.

The non-transitory computer-readable storage medium may be any kind of recording device which stores computer-readable data. Examples of the non-transitory computer-readable storage medium include ROMs, RAMs, magnetic storage media such as magnetic tapes, floppy disks, and hard disks, optical recording media such as CD-ROMs and DVD-ROMs, and transmission media such as carrier waves and Internet transmission media. The non-transitory computer-readable storage medium may also be a distributed network, and the computer-readable code may be stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of controlling devices connected to a controller, the method comprising:
obtaining a service rule comprising a plurality of device type information, a plurality of first conditions and a plurality of first actions, wherein each of the plurality of first conditions corresponds to at least one of the plurality of first actions based on the plurality of device type information, and a first condition among the plurality of first conditions and a first action corresponding to the first condition among the plurality of first actions are applicable to a device type of a device type information among the plurality of device type information;
selecting at least one device from the devices connected to the controller based on the service rule;

modifying the service rule to be applicable to the at least one selected device, wherein the modifying of the service rule comprises changing the device type information to a device identification information of the at least one selected device based on a specification of the at least one selected device, and changing the first condition and the first action of the device type information related with the at least one selected device into a second condition and a second action which are applicable to the at least one selected device;

determining whether the second condition is satisfied; and transmitting, in response to determining that the second condition is satisfied, a control command controlling the at least one selected device to perform the second action, wherein the specification of the at least one selected device includes technical information of the at least one selected device, and wherein the plurality of first actions include executing actions to be simultaneously triggered based on the first condition being satisfied, and the service rule includes information of a number of the executing actions to be simultaneously triggered.

2. The method of claim 1, wherein the first condition and the first action comprise a location information indicating a location to which the service rule is to be applied.

3. The method of claim 2, wherein the selecting the at least one device comprises selecting the at least one device from among devices installed at the location.

4. The method of claim 1, wherein the controlling the at least one selected device comprises changing the second action into the control command.

5. The method of claim 1, wherein the plurality of first conditions include triggering conditions each of which is to be satisfied to execute the first action, and the service rule includes information of a number of the triggering conditions to be satisfied.

6. A control apparatus configured to control devices connected to the control apparatus, the control apparatus comprising:

a communicator; and at least one processor configured to:

obtain a service rule comprising a plurality of device type information, a plurality of first conditions and a plurality of first actions, wherein each of the plurality of first conditions corresponds to at least one of the plurality of first actions based on the plurality of device type information, and a first condition among the plurality of first conditions and a first action corresponding to the first condition among the plurality of first actions are applicable to a device type of a device type information among the plurality of device type information;

select at least one device from the devices connected to the control apparatus based on the service rule;

modify the service rule to be applicable to the at least one selected device, wherein the modifying of the service rule comprises changing the device type information to a device identification information of the at least one selected device based on a specification of the at least one selected device and changing the first condition and the first action of the device type information related with the at least one selected device into a second condition and a second action which are applicable to the at least one selected device;

determining whether the second condition is satisfied; and transmitting, in response to determining that the second condition is satisfied, a control command controlling the at least one selected device to perform the second action, wherein the specification of the at least one selected device includes technical information of the at least one selected device, and wherein the plurality of first actions include executing actions to be simultaneously triggered based on the first condition being satisfied, and the service rule includes information of a number of the executing actions to be simultaneously triggered.

7. The control apparatus of claim 6, wherein the first condition and the first action comprise a location information indicating a location to which the service rule is to be applied.

8. The control apparatus of claim 7, wherein the at least one processor is configured to select the at least one device from among devices installed at the location.

9. The control apparatus of claim 6, wherein the at least one processor is configured to change the second action into the control command.

10. The control apparatus of claim 6, wherein the plurality of first conditions include triggering conditions each of which is to be satisfied to execute the first action, and the service rule includes information of a number of the triggering conditions to be satisfied.

* * * * *